United States Patent [19]
Levinson

[11] Patent Number: 5,566,171
[45] Date of Patent: Oct. 15, 1996

[54] MULTI-MODE HIGH SPEED NETWORK SWITCH FOR NODE-TO-NODE COMMUNICATION

[75] Inventor: Frank H. Levinson, Palo Alto, Calif.

[73] Assignee: Finisar Corporation, Mountian View, Calif.

[21] Appl. No.: 404,873

[22] Filed: Mar. 15, 1995

[51] Int. Cl.$^6$ .................................................. H04L 12/56
[52] U.S. Cl. ........................... 370/60.1; 370/68.1; 370/15
[58] Field of Search .............................. 370/60, 60.1, 15,
370/94.1, 58.1, 58.2, 68.1; 340/825.5

[56] References Cited

U.S. PATENT DOCUMENTS

| | | | |
|---|---|---|---|
| 3,129,407 | 4/1964 | Paull. | |
| 4,038,638 | 7/1977 | Hwang | 340/825.8 |
| 4,521,880 | 6/1985 | Orsic | 370/58.2 |
| 4,566,007 | 1/1986 | Richards | 340/825.8 |
| 4,616,256 | 10/1986 | Boutmy | 348/6 |
| 4,630,258 | 12/1986 | McMillen | 370/60 |
| 4,696,000 | 9/1987 | Payne, III | 370/60 |
| 4,903,260 | 2/1990 | Boettle et al. | 370/60 |
| 5,138,615 | 8/1992 | Lamport et al. | 370/60 |
| 5,267,235 | 11/1993 | Thacker | 370/60 |
| 5,317,565 | 5/1994 | Crouse et al. | 370/58.2 |
| 5,430,442 | 7/1995 | Kaiser et al. | 340/825.5 |

OTHER PUBLICATIONS

"TQ8016 16×16 Digital Crosspoint Swich"; TQS Digital Communications and Signal Processing; date unknown.

*Primary Examiner*—Hassan Kizou
*Assistant Examiner*—Seema S. Rao
*Attorney, Agent, or Firm*—Flehr, Hohbach, Test, Albritton & Herbert

[57] ABSTRACT

The present invention provides a an improvement in circuit switching for a network comprising a switching apparatus having a plurality of transceivers for interfacing directly with a like plurality of user nodes. Each of the transceivers having a receive and transmit through port for passing data to and from user nodes and a network, said data comprising a connect sequence, a first wait sequence, a routing packet, a second wait sequence, user data, and a disconnect sequence. The switching apparatus further includes means for isolating each transceiver to loop back data when not in use and switching means for directly connecting any pair of transceivers. Finally a switch controller is provided for establishing and prioritizing matrix connections and disconnections, and decoding routing packets. In operation, a requesting node sequentially transmits a connect sequence, routing packet and user data to the network switch assuming node-to-node communication has been established with a target node, whereupon the isolation means loops user data back to the requesting node when the target node is unavailable.

30 Claims, 20 Drawing Sheets

|     | OPCODE | DATA |     |
| --- | --- | --- | --- |
| 450 | 0000 | WAIT | |
| 452 | 0001 | Requesting Node Port ID (Source) | 453 |
| 454 | 0010 | Nodes Requesting Disconnect (PORT$_{0-15}$) | 455 |
| 456 | 0011 | Target Node Port ID | 457 |
| 458 | 0100 | Target Node Port ID | 459 |

|  | OPCODE | DATA |  |
|---|---|---|---|
| 450 | 0000 | N/A |  |
| 452 | 0001 | Requesting Node Port ID (Source) |  |
| 454 | 0010 | Nodes Requesting Disconnect (PORT$_{0-15}$) |  |
| 456 | 0011 | Target Node Port ID |  |
| 458 | 0100 | Target Node Port ID |  |
| 1402 | 0101 | Source Node Port ID | 1404 |

5,566,171

MULTI-MODE HIGH SPEED NETWORK SWITCH FOR NODE-TO-NODE COMMUNICATION

The present invention relates generally to communication networks. More particularly, to a switching apparatus having a fast and a queued mode for configuring a network for node-to-node communications where a blind interrogation routing protocol is used in the fast mode.

BACKGROUND OF THE INVENTION

The present invention provides an improvement in communication networking by providing a high-speed routing mechanism for transmitting data between nodes on a communications network.

Conventional local area networks provide switches or bridges for linking users on a network. Switching systems in a communications network environment process requests from users to link a requesting user node with a target node by decoding packets containing routing information generated by the requesting node.

Message switching is a form of data switching which relies on a store-and-forward technology. Each switch within a given network stores a network message in its entirety (packets) and transfers them out of storage upon the availability of the target destination. Often interrupt strategies are employed to achieve near real-time operation over portions of the network that are nearly transparent to the end users. Storage costs and complex interrupt handlers make these systems undesirable for low cost networks which seek to operate at or near real time with minimal system latency.

Circuit switching is a form of data switching which dedicates system resources to a particular call or transaction. Physical resources in time, space or frequency spectrum are dedicated to the exclusive use of a single call for the duration of that call. Circuit switching apparatus contain no storage devices, and merely route information based on the availability of a given target destination. Accordingly, "blocking" may result, wherein a call or transaction may not be established, due to the dedicated nature of the circuit switching connections whenever a system resource is in use.

Circuit switching systems operate in real time providing node to node communications once a connection is made between a source and target destination. The performance of a circuit switching system can be measured in terms of connect time and latency. Connect time refers to the amount of time it takes to make a requested connection between a source and target node in a network. Latency is a related consideration which refers to the time period between the application of a stimulus (a request for connection in a network) and the first indication of a response from the network. Most network communications are inherently short duration in nature, on the order of magnitude of 5 milliseconds or less. Accordingly, networks employing circuit switching systems are required to rapidly connect and disconnect physical resources as fast as possible to avoid "blocking" of transactions, and achieve transparent real time communications on the network. Any improvements in speeding up the connect and disconnect cycles as well as improving the overall system latency is desirable in networks employing circuit switching.

SUMMARY OF THE INVENTION

It is an object of the present invention to provide a high bandwidth, and high speed switching system with minimal latency for network communications.

It is a further object of the present invention to provide a high speed switching system which directly switches available resources while also allowing for a user to queue a routing request to initiate connection upon resource availability.

The apparatus of the present invention comprises a switching apparatus including a plurality of transceivers for interfacing directly with a like plurality of user nodes. Each of the transceivers has a receive and transmit through port for passing data to and from user nodes and a network. Transmitted data includes a connect sequence, a first wait sequence, a routing packet, a second wait sequence, and user data. The switching apparatus further includes circuitry for isolating each transceiver so as to loop back data when not in use and a switching matrix for directly connecting any pair of transceivers. Finally a switch controller is provided for establishing and prioritizing matrix connections and disconnections, and decoding routing packets. In operation, a requesting node sequentially transmits a connect sequence, routing packet and user data to the network switch assuming node-to-node communication has been established with a target node, whereupon the isolation circuitry loops user data back to the requesting node when the target node is unavailable.

In a second mode of operation, the requesting node may queue a connection request by transmitting a plurality of connection sequences from which target and source node information may be derived.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
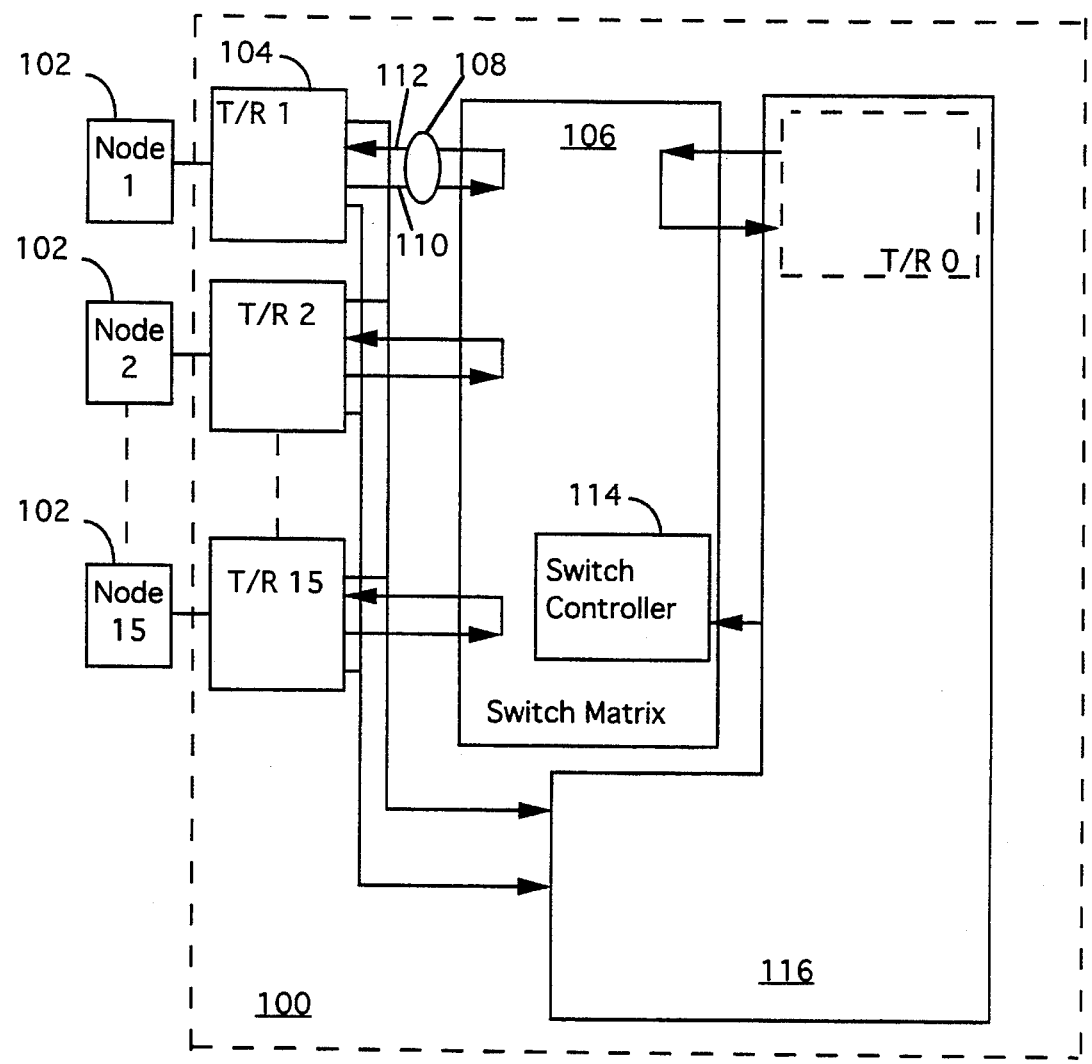
FIG. 1 is a block diagram of a switching apparatus according to the preferred embodiment of the present invention.

Referring first to FIG. 1, a switching apparatus 100 incorporating the teaching of the present invention is shown. A plurality of nodes 102 are connected to the switch 100 at a like plurality of transceivers 104. The transceivers 104 receive and transmit serial data between the switching apparatus 100 and the nodes 102. Each transceiver 104 is coupled to a switch matrix 106 via a high speed serial I/O link 108. The high speed serial I/O link includes separate transmit 110 and receive links 112 thereby allowing for full duplex operation in each node to node connection.

The switch matrix 106 includes a switch controller 114 for configuring the transmit 110 and receive links 112 of each transceiver to either loop back data or establish full duplex communication with any other node 102 connected to the switch matrix 106. Control electronics 116 coupled to the switch matrix 106 configures the switch matrix 106 while also storing and transmitting switch configuration information to the nodes 102 attached to the switching apparatus 100.

Figure 2:
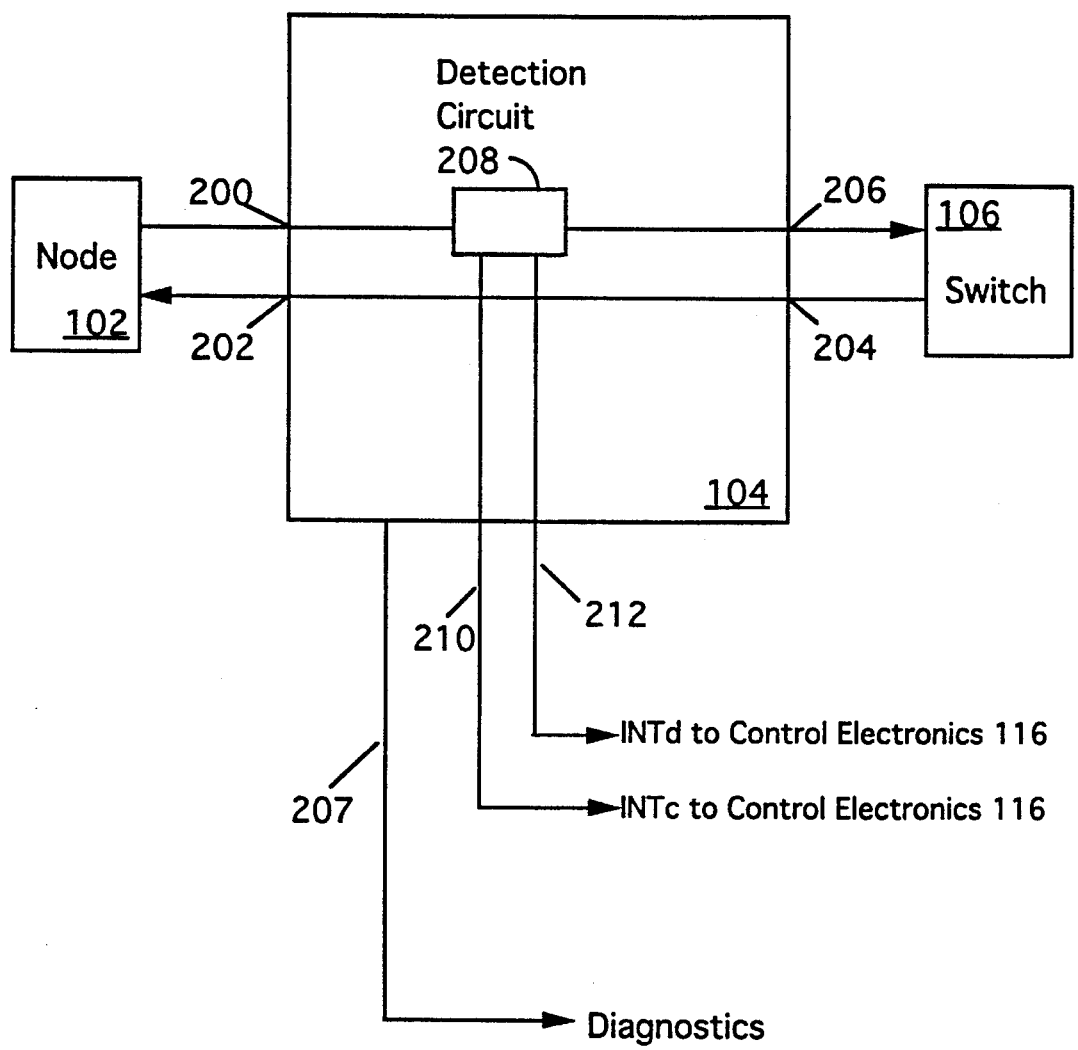
FIG. 2 is a block diagram of a transceiver according to the preferred embodiment of the present invention.

Referring now to FIG. 2, a transceiver 104 according to the preferred embodiment of the present invention is shown. The transceiver 104 has a first serial data input 200 and first serial data output 202 for transmitting data between a user node 102 and the transceiver 104. The transceiver 104 also includes a second serial data input 204 and second serial data output 206 for transmitting serial data between the transceiver 104 and the matrix switch 106. A diagnostics port 207 is provided to monitor transceiver 104 performance by the control electronics 116.

In the preferred embodiment, the transceiver 104 is a plug-and-play style device which may be plugged into the switching apparatus as required to meet various node transmission requirements. The transceivers may be customized to conform to user node requirements such as optical transceivers for converting fiber optics transmissions, RF transceivers or a conventional twisted pair configuration. The switching apparatus may be configured with a plurality of interfaces designed to meet the individual needs of the individual nodes. One such transceiver providing a fiber optic interface between a node and the switching apparatus is the Fiber Optic Transceiver having part number FTR-8510-1SW manufactured by Finisar.

The transceiver 104 also includes a detection circuit 208 and corresponding connect 210 and disconnect output port 212 for detecting initiation and termination sequences passed from a source node to the switching apparatus 100. The detection circuit 208 monitors the serial transmission stream from its corresponding node 102, waiting for the detection of a initiation sequence. In the preferred embodiment of the present invention, the initiation sequence is an unbalanced series of 40 binary bits (22 "1's" followed by 12 "0's" followed by a binary sequence of "101010") transmitted by the source node indicating that a routing packet of information is forthcoming. Upon recognizing the initiation sequence, the detection circuit 208 generates a connect request signal pulse whose edge is used to trigger logic circuits in the control electronics 116 via the connect output port 210.

In the preferred embodiment, the termination sequence is an unbalanced series of forty binary bits (22 "0's" followed by 12 "1's" followed by a binary sequence of "010101") transmitted by the source node indicating that the connection between a source node and a target node should be terminated. Upon recognizing the termination sequence, the detection circuit 208 generates a disconnect request signal pulse whose edge is used to trigger logic circuits in the control electronics 116 via the disconnect output port 212. Those ordinarily skilled in the art will recognize that the particular sequence of binary 1's and 0's selected may be of any length or combination in either the connection or termination sequence. These sequences of 1's and 0's were selected to minimize the occurrence of conflicts associated with real data and the connect or termination sequences themselves while remaining "neutral" overall. The detection circuit 208 may be implemented using RC circuits and comparators or by other circuitry known in the art.

Figure 3:
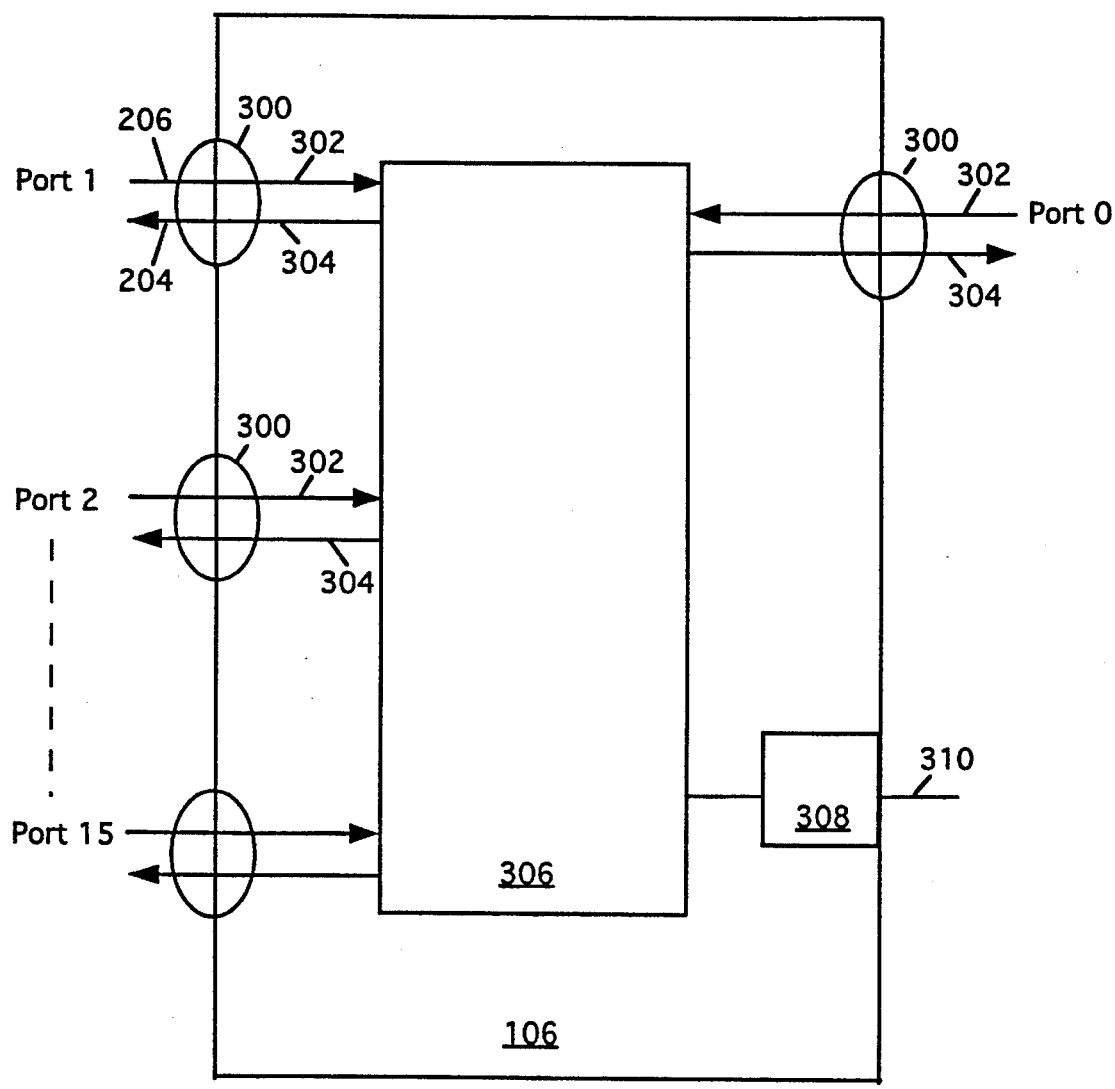
FIG. 3 is a block diagram of a switch matrix according to the preferred embodiment of the present invention.

Referring now to FIG. 3, the switch matrix 106 of the preferred embodiment of the present invention is shown. The switch matrix 106 includes a plurality of ports 300, each having an input 302 and output 304. Each transceiver 104 is coupled to the switch matrix 106 at one of the ports 300.

More specifically, the second serial data output 206 from each transceiver 104 is coupled to an input 302 of a corresponding port 300. Similarly, the second serial data input 204 from each transceiver 104 is coupled to an output 304 of the same port 300. In this way, by configuring the switch matrix 106 to couple a particular port's input 302 to the same ports output 304, a loop-back configuration may be established for any individual node. In loop-back, any serial transmissions generated by a source node as an output will be looped-back by the switch matrix to the same source node as an input.

In the preferred embodiment, the switching apparatus 100 is configured to include 16 ports in the switch matrix 106. This configuration will support switching between 15 different nodes in an isolated switch network, or combinations of 15 different nodes and other switches in a multiple switch environment. Those ordinarily skilled in the art will recognize that any number of ports (n ports) may be provided in the switch matrix to service n–1 devices. The function of the extra port will be explained in further detail in conjunction with the control electronics 116 described below.

The switch matrix 106 includes cross-coupling means 306 for coupling any pair of inputs 302 and outputs 304, thereby establishing full duplex communication between any source and any target node in the network. The switch matrix 106 further includes switch control 308 for receiving matrix configuration commands via a command port 310. The switch control 308 processes connect and disconnect requests generated by the control electronics 116. In the preferred embodiment of the present invention, switch matrix 106 is a sixteen port cross point switch part number TQ8016 manufactured by Triquint Semiconductor, Inc.

Figure 4:
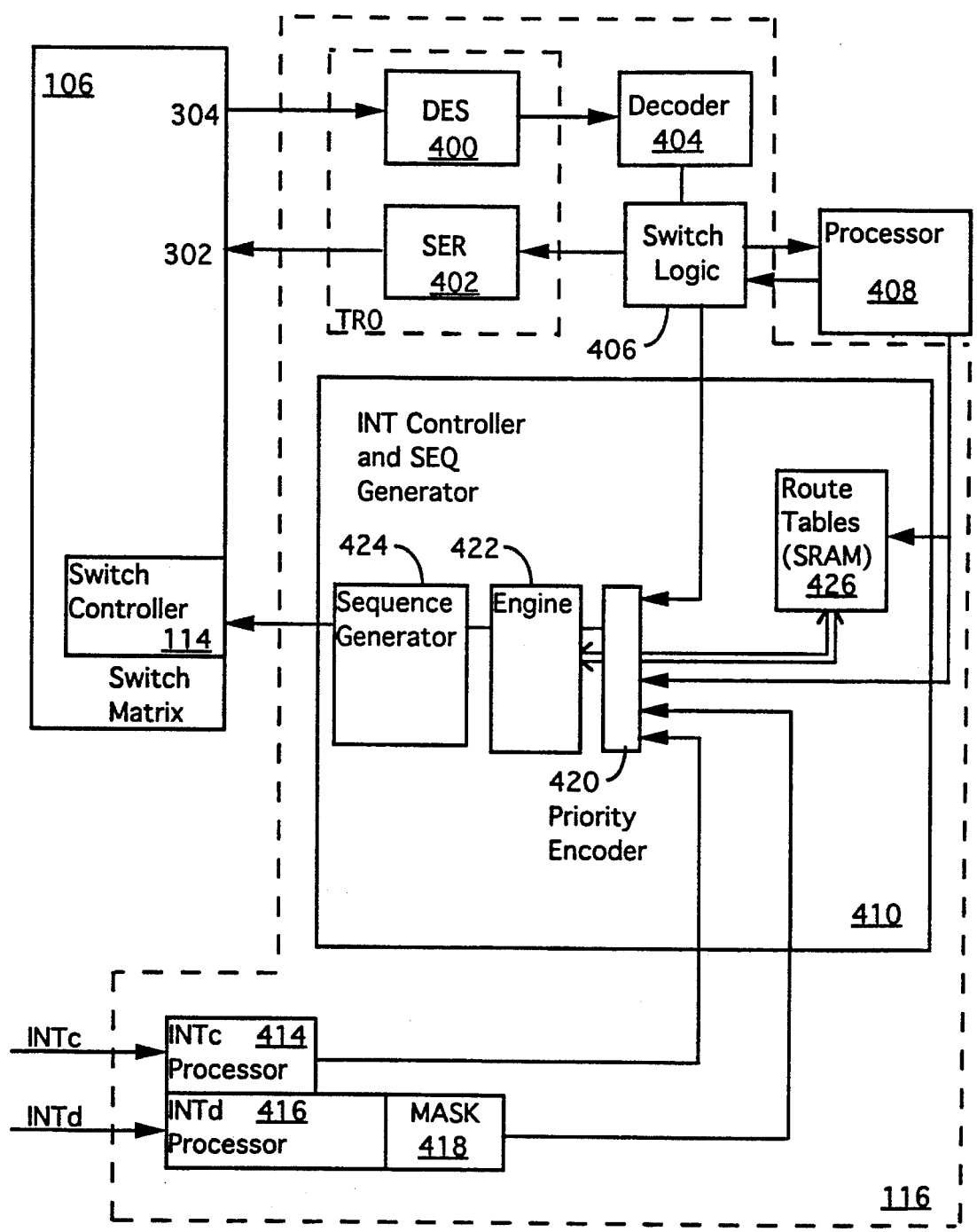
FIG. 4 is a block diagram of the control electronics for configuring the switch matrix.

Referring now to FIG. 4, the control electronics 116 of the present invention is shown. A deserializer 400 is coupled to the output port 304 of one of the switch matrix 106 ports 300. The corresponding input port 302 is coupled to a serializer 402. The deserializer 400 and serializer 402 act as an interface between the control electronics and the switch matrix 106. The deserializer 400 converts serial stream inputs which have been routed from the switch matrix 106 into a parallel data stream for transmission to a decoder 404 for processing. The serializer 402 transforms data to be sent out by the control electronics 116 into a serial stream for transmission to the nodes 102. The combination of the deserializer 400 and the serializer 402 acts much in the same way as transceivers 104, with the control electronics 116 responding just as any other node connected to the switch matrix ports.

Decoder 404 is coupled to switch logic 406, which in turn is coupled to Interrupt Controller and Sequence Generator 410. The decoder 404 decodes the deserialized incoming serial stream which has been routed via the switch matrix 106 into the control electronics 116 for processing and generates a service request (fast switch request) for transmittal to the Interrupt Controller and Sequence Generator 410. The serial data stream contains routing information identifying both the switch matrix and a target port (receiver node) associated with a pending connection request.

Figure 5:
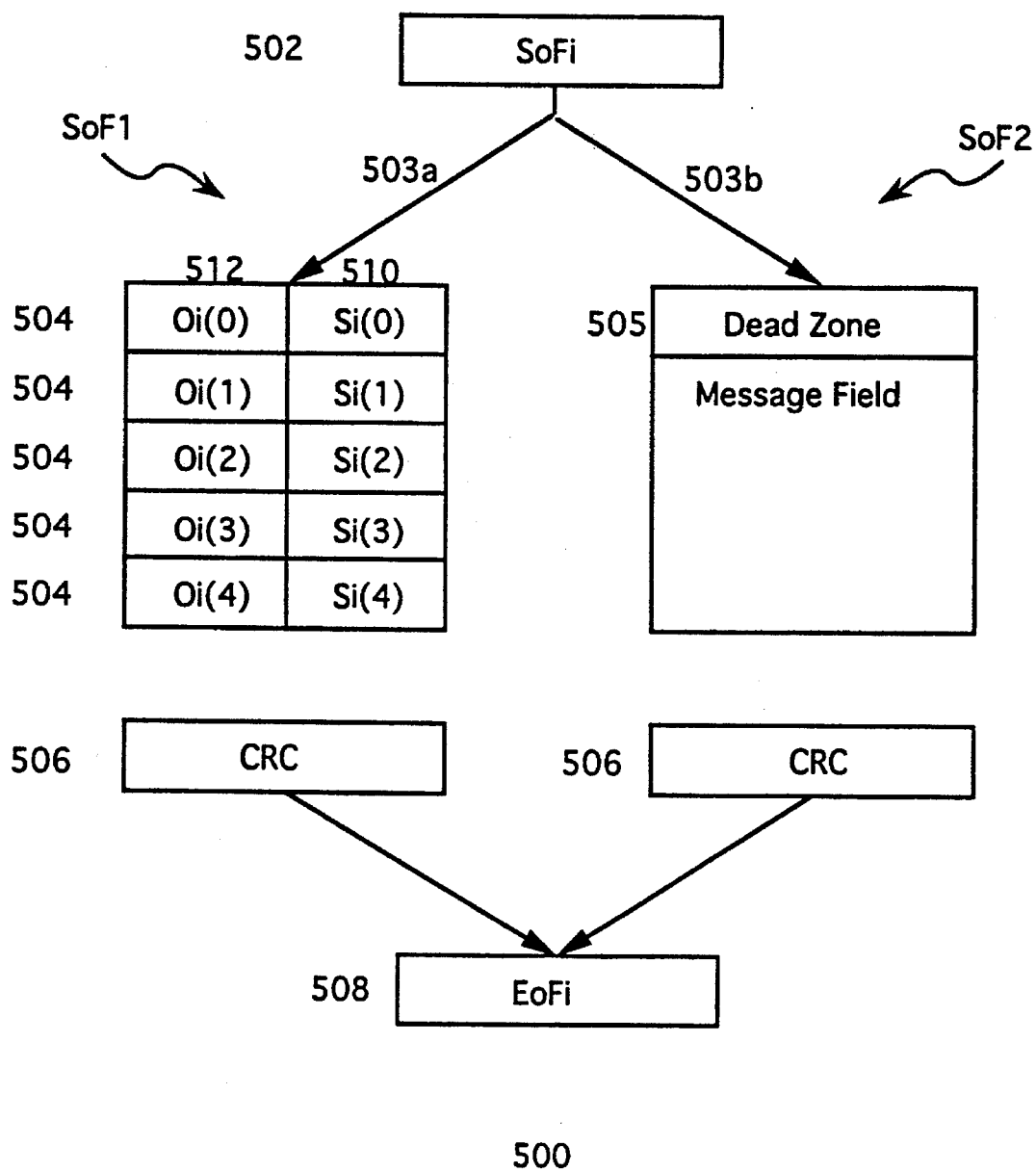
FIG. 5 shows the routing data packet protocol according to the preferred embodiment of the present invention.

A data structure 500 for routing packet requests is as shown in FIG. 5. More specifically, a sixteen byte routing packet is transmitted by a source node 102 via the switch matrix 106 for processing by the control electronics 116. The sixteen bytes include a start of packet word 502 (2 bytes), five routing sequences 504 or alternatively a message field 505, an error correction/detection field 506 and an end of packet word 508 (2 bytes). The start of packet word is of two forms, a connection identifier (SOF1) indicating the source node is requesting a connection (503a) or alternatively a information request identifier (SOF2) indicating the source node is sending (or requesting) data to (or from) the switch processor 408. When a connection request is identified, up to five routing sequences 504 may be requested for processing by the control electronics 116. The routing sequence 504 has up to 5 routes specified by the source node for connection. In the preferred embodiment, only one of the routing packets is directed to the current switch, with the remaining routes designating other routes on other switches in a multiple switch environment. Each routing sequence 504 identifies a switch ID 510 and port ID 512. The switch ID 510 is one byte in length (8 bits) and can therefore identify up to 256 switches in a multi-switch environment to be addressed. The multi-switch environment will be discussed in greater detail below.

Switch Logic 406 identifies the decoded routing packets which contain information requests (message field 505) and routes these requests directly to the processor 408. Similarly, the switch logic will identify any connection requests that correspond to this particular switch and generate a service request to the Interrupt and Sequence Generator 410. The switch logic 406 will only generate service requests when the ID of the particular switch matches the ID in the switch designation field 512 recited above. Accordingly, in the preferred embodiment the switch logic may generate up to 5 service requests for connections by the resident switch based on the decoded routing information.

Referring again to FIG. 4, control electronics 116 also includes a connect interrupt processor (INTc processor) 414. The INTc processor 414 is coupled to each of the transceivers 104 of the switching apparatus 100 via the connect output ports 208. Upon receipt of a connect sequence by the transceiver 104, a connect request is transmitted via the connect output port 208 to the connect interrupt processor 414. In the preferred embodiment of the present invention, the connect interrupt processor 414 processes only a single connect request from any of the transceivers at a given time. Those ordinarily skilled in the art will recognize that the connect interrupt processor may be configured to service a plurality of connection requests, dependent only on the number of ports in the switch matrix which are dedicated to servicing initial connection requests (available deserializer ports). Thereafter, the connect interrupt processor 414 generates a service request for processing by the Interrupt Controller and Sequence Generator 410 upon receipt of a connection request from a requesting node.

Those ordinarily skilled in the art will recognize that the connect interrupt processor 414 could be configured to process more than a single interrupt connect request at a time by providing the connect interrupt processor with a mask register or queuing function in order to allow for a queued request to be processed by the connect interrupt processor. In addition, the connect interrupt processor could be configured to process multiple connect requests as long as the control electronics 116 were provided with a plurality of deserializer ports for receipt of the connect routing packets. The preferred embodiment of the present invention includes only a single deserializer and serializer port such that a minimum number of ports are utilized for overhead in configuring the switch while a maximum number of ports is available for connection to user nodes.

Control electronics 116 also includes a disconnect interrupt processor 416. In a similar fashion, the disconnect interrupt processor is connected to each of the transceivers 104 at the disconnect output port 210. Upon receipt of a disconnect sequence, the transceivers will signal to the disconnect interrupt processor 416 of control electronics 116 that a disconnection request is pending. The disconnect interrupt processor includes a mask register 418 for storing or queuing disconnect requests from the particular transceivers. A plurality of disconnect requests may be pending in the disconnect interrupt processor at a given time, however to avoid blocking, disconnect requests should be processed as soon as possible in order to free up system resources for other connections. The disconnect interrupt processor 416 generates a service request for processing by the Interrupt Controller and Sequence Generator 410 upon receipt of a disconnection request from a requesting node.

The interrupt controller and Sequence Generator 410 processes connection and disconnection requests and generates command sequences for transmittal to the switch controller 114 for configuring the switch matrix 106. The interrupt controller and Sequence Generator 410 includes a priority encoder 420, a state machine engine 422, sequence generator 424 and a dual port SRAM 426. The dual port SRAM 426 includes route tables reflecting the current routing configuration for the switch matrix 106. A sample routing table is as shown in table 1. In the preferred embodiment, the routing table contains a port ID, a first nibble indicating which port is sending this port data, and a second nibble and status bit associated with queued requests. The routing table is organized by Input (source) address, and corresponding current output (destination) address. In addition, status bits are provided indicative of the current request status for each port. The status bits reflect the four states that each port operates in, specifically: the 00 state indicates the port is in loopback; the 01 state indicates a port (technically, it is the node connected to the port) is requesting the deserializer, but it is unknown if it is available; the 10 state indicates the port (node) is requesting, and has the deserializer, but it is unknown if the requested port (node) is available; and finally, the 11 state indicates the port is connected to another port.

TABLE 1

| Input Port (Source) | Output Port Current (Destination) Nibble1 | Output Port Requested (Queue Destination) Nibble2 | Status Bits |
|---|---|---|---|
| 0 | 0 | 0 | 0,0 |
| 1 | 4 | 0 | 1,1 |
| 2 | 2 | 12 | 0,1 |
| 3 | 3 | 14 | 1,0 |
| 4 | 1 | 0 | 1,1 |
| — | — | — | — |
| 15 | 15 | 0 | 0,0 |

The priority encoder 420 receives service requests from the connection interrupt processor 414, the disconnect interrupt processor 416, the switch logic 406 (fast switch requests) and the processor 408. The priority encoder 420 prioritizes the service requests and transmits a state machine command for processing by the state machine engine 422. In the preferred embodiment, fast switch requests from the switch logic 406 and connection requests from the IntC processor 414 are given highest priority, followed by disconnect requests, and lowest priority is given to processor requests.

Figures 6, 7A:
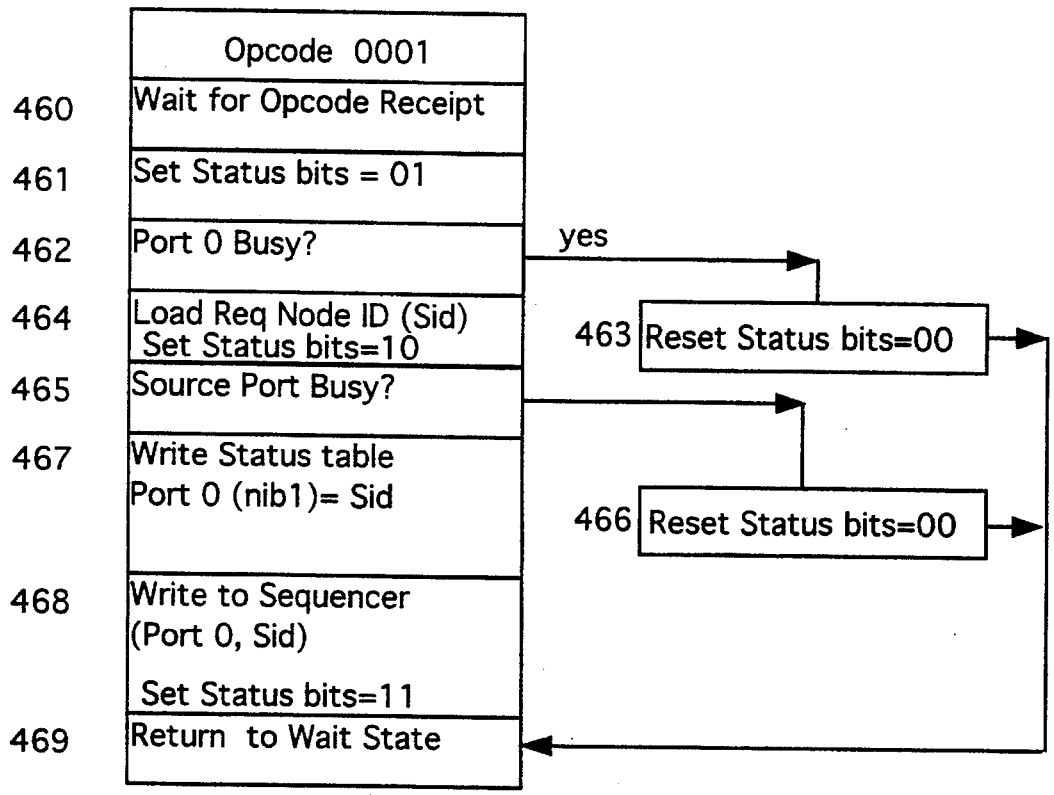
FIG. 6 shows the state machine engine command format as generated by the priority encoder according to the preferred embodiment of the present invention.
FIG. 7a shows the flow of the state machine engine responsive to a connect interrupt received from the connect interrupt processor.

The state machine command includes an op code and data field, as shown in FIG. 6. When no service requests are made, the priority encoder 420 generates state command 450 which maintains the state machine engine 422 in a wait mode.

Upon receipt of a connection request from the connection interrupt processor 414, the priority encoder 420 generates a state machine command 452 including source ID 453 indicating to the state machine engine 422 that a particular source port (source ID 453) is requesting a connection to allow for the passing of routing information to the decoder in the control electronics. The state machine will process the state machine command 452, and if the port is available the state machine 422 will generate the switch command to the sequencer and correspondingly update the status bits in the route table 426 of the connecting node from 00 (in loopback) to 01 (in loopback, but requesting connection to the deserializer). The operation of the state machine will be described in greater detail below.

Upon receipt of a disconnection request from the disconnection interrupt processor 416, the priority encoder 420 generates a state machine command 454 including disconnect PORT data 455 indicating to the state machine engine 422 which ports (0–15) are requesting reconfiguration back to the loop-back mode.

Upon receipt of a fast switch service request from the switch logic 406, the priority encoder 420 generates a state machine command 456 including a target port ID 457 indicating to the state machine engine 422 which target port has been identified from the decoded routing information transmitted via the switch matrix 106.

Finally, the priority encoder 420 will generate state machine command 458 in response to a processor request to transmit information about the switch matrix configuration pursuant to requests from individual nodes. State machine command 458 includes target node ID 459 indicating the target node to which the processor is to transmit information.

Referring now to FIGS. 7a–d, the operation of the state machine engine 422 will be described. The state machine engine 422 will idle in a wait state until receipt of a state machine command as described above. Upon receiving a state machine command having an op code value of 0001, the state machine engine will execute the initial connect sequence according to the process steps of FIG. 7a. Specifically, upon receipt of the op code (460), the state machine will set the status bits for the requesting node to 01 (461) and then check the status table stored in the dual port SRAM 426 to determine whether the decoder 404 of the control electronics 116 is busy processing a request at this time (462). In the preferred embodiment this may be accomplished by reading the status bits in the state table corresponding to Port 0. As was described previously, the status bits indicate whether a port is busy. Accordingly, the state machine engine 422 will check the status bits stored at Port ID 0 to determine if the deserializer is busy. A value of "00" indicates that the Port 0 is in loop back, and thus the deserializer is free to process a connection request. Any other value will cause the state machine to update the status table for the requesting node back from a 01 state (requesting the deserializer) to the 00 state (reset) (463) resulting in the routing packet data sent by the requesting node to be looped back to itself, indicative of a failed connection. The state machine will thereafter revert to a wait state because the deserializer is currently busy (469).

Assuming the deserializer is not busy, the state machine engine will write update the status bits in the route table for the requesting node from the 01 state (in loopback requesting the deserializer) to the 10 state (in loopback requesting connection to a port) and thereafter load the source ID (Sid) information from the priority encoder (464). Next, the state machine checks to see if the source port is already busy (465). This check is performed by reading the status bits associated with the source port. The status bits associated with each Port ID indicates whether the port is busy (value 11 indicates the port is busy). Accordingly, the state machine engine 422 will check the status bits stored at Port ID Sid to determine if the source port is busy. A value of 00 indicates that the Port Sid is in loop back, in which case the connection request may be processed. State 465 is utilized primarily in conjunction with multiple switch configurations, as discussed below with reference to FIG. 9. Any other value will cause the state machine to update the status table for the requesting node back from a 10 state (requesting the Sid port) to the 00 state (reset) (463) resulting in the routing packet data sent by the requesting node to be looped back to itself, indicative of a failed connection. The state machine will thereafter revert to a wait state because the because the source port is currently busy (469).

If the source port and the deserializer are both not busy the state machine engine 422 will then write an update (466) to the routing tables stored in the dual port SRAM 426 to set the Port ID 0 nibble 1 equal to the source ID. Finally, the state machine will write a matrix configuration command to the sequencer 424 for transmission to the switch controller 114 of switch matrix 106 and update the status bits associated with the source (Sid) and deserializer (Port 0) ports to the 11 state (468). Upon completion of the sequencer write (468), the state machine will return to the wait state until another state machine command is received. After the requesting node is connected to the deserializer via Port 0, the deserializer must clock recover and re-synchronize the incoming data. Each incoming packet/routing sequence provides a string of idle codes between the transmission of the connection sequence and the routing data which are sufficiently long to allow for the switch connection and this resynchronization process. In the preferred embodiment the idle period is typically 500 ns.

Figure 7B:
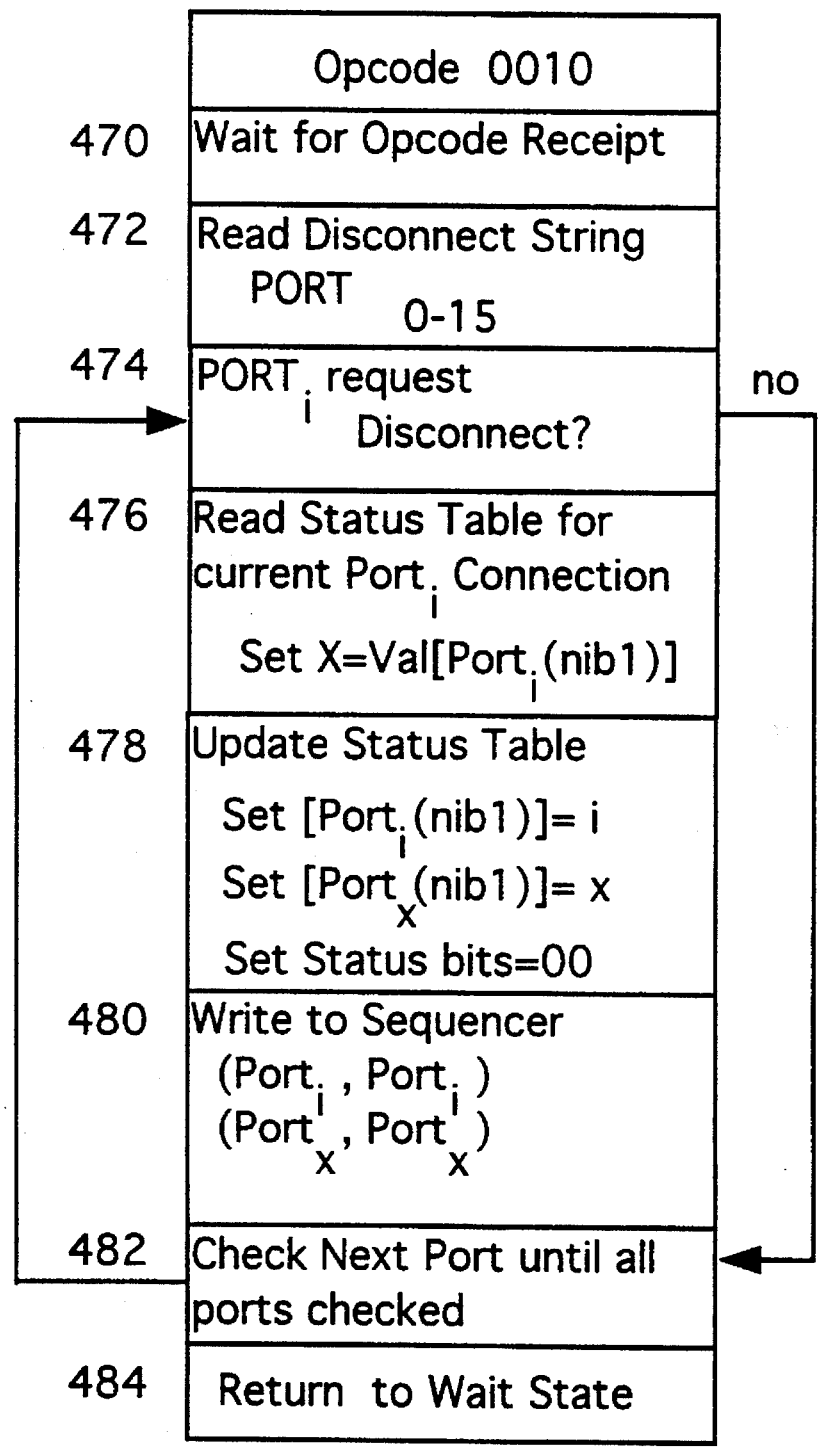
FIG. 7b shows the flow of the state machine engine responsive to a disconnect interrupt received from the disconnect interrupt processor.

Referring now to FIG. 7b, the process for performing a disconnect sequence responsive to a state machine command 0010 is shown. The state machine engine 422 will idle in a wait state until receipt of a state machine command as described above. Upon receiving a state machine command having an op code value of 0010 (470), the state machine engine will load (472) the disconnect string PORTe, is from the priority encoder 420 identifying which ports have requested disconnection. In the preferred embodiment the disconnect string $PORT_{0-15}$ is 16 bits in length with each bit representing one of the 16 ports associated with the switch matrix 106. The state machine engine 422 will process the $i^{th}$ bit and determine if a disconnection request has been made (474). If the $i^{th}$ bit is set to 0, then no disconnection sequence is required and the state machine engine may process the next bit in the disconnect string. Alternatively, if the $i^{th}$ bit is set to 1, then the state machine will read the value stored in nibble 1 of Port i to determine the current switch configuration of Port i (476), whereby x is defined as equal to the Port ID currently stored at nibble 1 of Port i. The state machine engine will then write an update (478) to the routing tables stored in the dual port SRAM 426 to set the Port i nibble 1 equal to i, and the Port x nibble 1 equal to x, while updating the status bits for both Port i and Port x to state 00 (loopback). In this way each of Port i and Port x will be configured for loopback. The state machine will write a matrix configuration command (480) to the sequencer 424 for transmission to the switch controller 114 of switch matrix 106 reflecting this reconfiguration.

The State machine check each bit in the disconnect string until all of the string has been processed (482). Upon completing processing of the last bit in the disconnect sequence, the state machine will return to the wait state until another state machine command is detected (484).

Figure 7C:
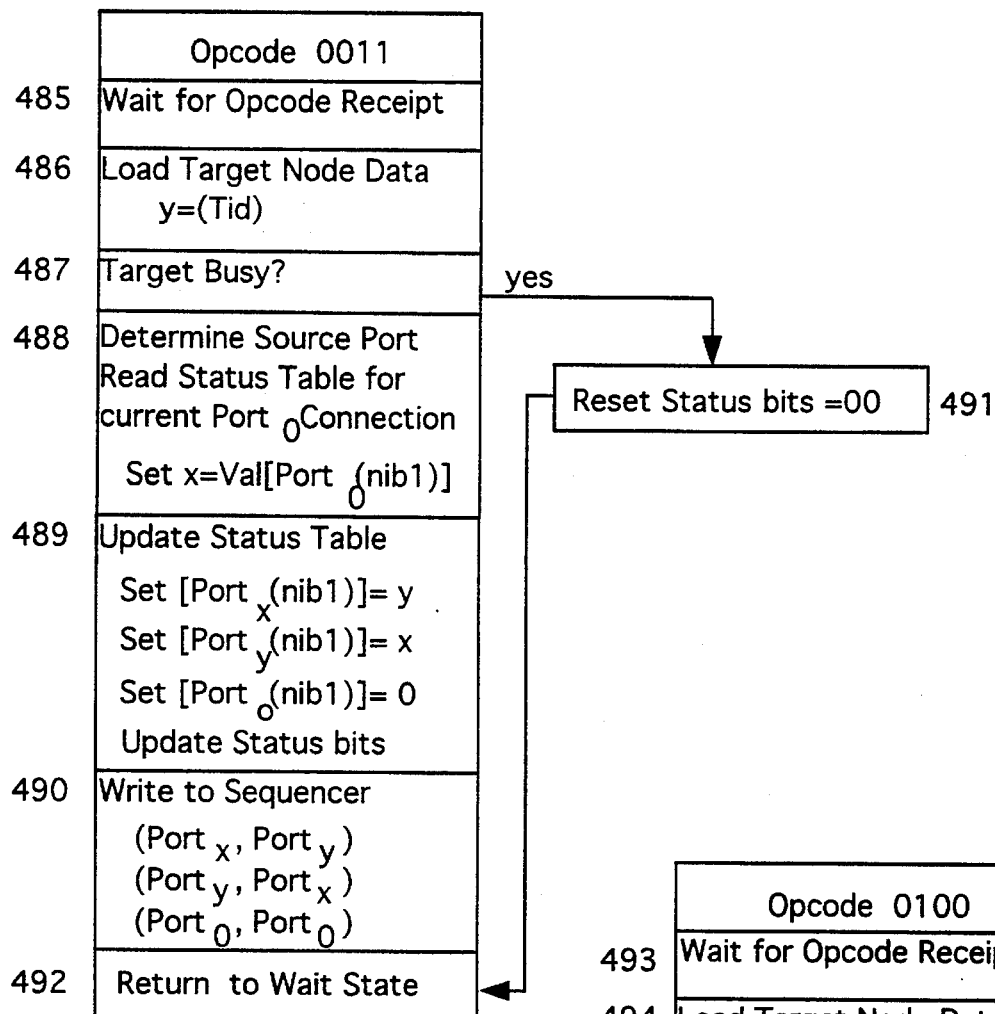
FIG. 7c shows the flow of the state machine engine responsive to a fast mode connect received from the decoder in the control electronics.

Referring now to FIG. 7c, the process for performing a fast connect sequence responsive to a state machine command 0011 is shown. The state machine engine 422 will idle in a wait state until receipt of a state machine command as described above. Upon receiving a state machine command having an op code value of 0011 (485), the state machine engine will load (486) the target node data from the priority encoder 420 identifying a target node (Port y) for connection. The state machine will next check (487) the status table stored in the dual port SRAM 426 to verify if the target node is busy at this time (connected to another port). Specifically, the state machine engine 422 will check status bits stored at Port y to determine if the target node is busy. A value of 00 indicates that the Port y is in loop back, and thus is free. If a 11 value is read, then the state machine will update the status bits for the source port to 00 (loopback) from 10 (in loopback, and requesting a port connection) (491) and will return the state machine to the wait state because the target is currently busy (492).

Assuming that the target is available, the state machine next will determine the source node (488). This may be accomplished by evaluating the connection of Port 0 (the deserializer) as defined by the state table. The Port 0 connection will reflect the source of the decoded routing packet information, and accordingly the source Port ID (Port x). Those ordinarily skilled in the art will recognize that the deserializer may be freed to be reconfigured to speed up data switching prior to the actual switching of the source port to the target port. Accordingly, a separate source port ID register or other means may be utilized in order to store this information as required. The state machine engine will then write an update (489) to the routing tables stored in the dual port SRAM 426 to set the Port x nibble 1 equal to y, the Port y nibble 1 equal to x, the Port 0 nibble 1 equal to 0 and the status bits for Port x and y to 11 and for Port 0 to 00. In this way Port x and y will be cross coupled in full duplex mode while Port 0 will be configured for loopback. The state machine will then write (490) a matrix configuration command to the sequencer 424 for transmission to the switch controller 114 of switch matrix 106 reflecting this reconfiguration. Finally, the state machine will return to the wait state until another state machine command is detected (492).

Figure 7D:
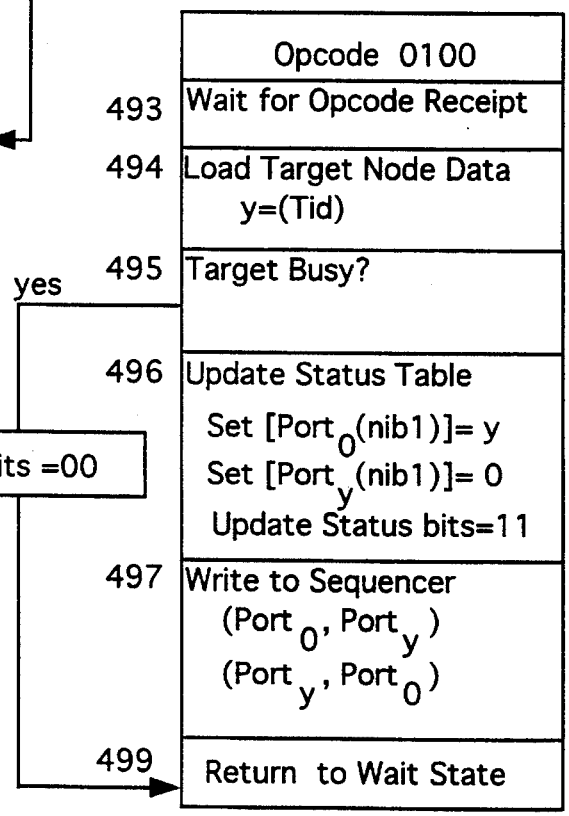
FIG. 7d shows the flow of the state machine engine responsive to a processor interrupt received from the CPU.

Referring now to FIG. 7d, the process for performing a processor connect sequence for connecting the processor via the serializer 402 to a target node responsive to a state machine command 0011 is shown. As was discussed in connection with FIG. 5, the routing packet transmitted by a source node 102 may be of the form requesting data from the switch processor 408.

The state machine engine 422 will idle in a wait state until receipt of a state machine command as described above (493). Upon receiving a state machine command having an op code value of 0100 (493), the state machine engine will load (494) the target node data from the priority encoder 420 identifying a target node (Port y) for connection to the processor. The state machine will check (495) the status table stored in the dual port SRAM 426 to verify if the target node is busy at this time (connected to another port). Specifically, the state machine engine 422 will check the status bits stored at Port y to determine if the target node is busy. A value of 00, indicates that Port y is in loop back, and thus is free. If a 11 value is read, then the state machine will update the status bits for the source port to 00 (loopback) from 10 (in loopback, and requesting a port connection) and will return the state machine to the wait state because the target is currently busy (498).

In a switch apparatus having more than one deserializer, or in a switch apparatus using a pipelined deserializer having pipelined request registers that store both source and target node IDs for each connection request, the state machine would be modified so that when two requests conflict and are being processed during overlapping time periods, the earlier request preempts the later request. In that embodiment, the status bits are used to indicate which request came earliest in time.

If the target node is not busy, the state machine engine writes an update (496) to the routing tables stored in the dual port SRAM 426 to set the Port y nibble 1 equal to 0 and Port 0 nibble 1 to y and the status bits for Port y and Port 0 to 11. In this way Port y and 0 will be cross coupled in full duplex mode. The state machine will then write a matrix configuration command (497) to the sequencer 424 for transmission to the switch controller 114 of switch matrix 106 reflecting this reconfiguration. Finally, the state machine will return to the wait state (499) until another state machine command is detected.

Upon connection by the switch matrix, the processor 408 will transfer the requested information via the switch logic 406 to the serializer 402. The serializer 402 will create a serial data stream including the requested information for transfer to the target node via the switch matrix 106.

Figure 8A:
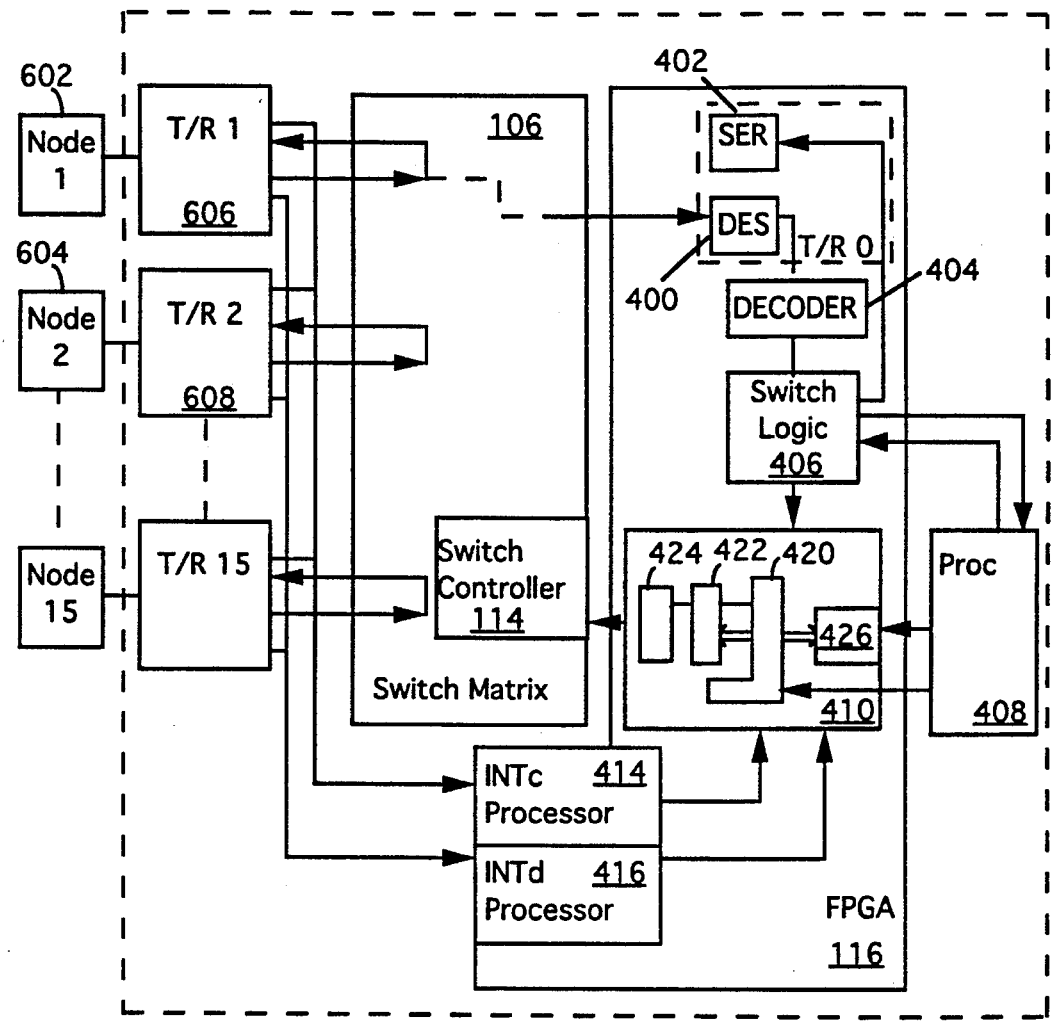
FIG. 8a shows the resultant switch configuration after the switching apparatus according to the preferred embodiment of the present invention has processed an initial connect interrupt from the INTc processor.
Figure 8B:
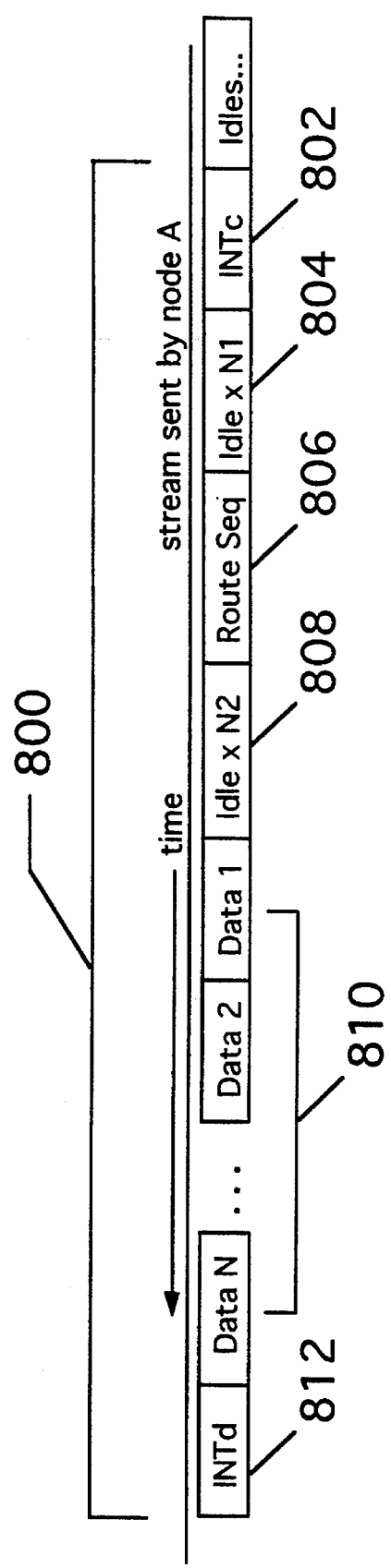
FIG. 8b shows a data sequence over time for transmission by a node requesting a particular switch configuration.

Referring now to FIG. 8a, the switching apparatus of the present invention is shown. In order to more clearly explain the present invention, a step by step description will be provided of how a requesting node 602 is able to achieve a connection with a target node 604 according to the apparatus of the present invention. Requesting node 602 transmits to transceiver 606 a data sequence 800 as shown in FIG. 8b. The sequence 800, also called the blind interrogation routing protocol comprises a connection sequence 802, a first idle period 804, a route sequence (conforming to the data structure 500 described herein) 806, a second idle period 808, a data stream 810 and finally a disconnection sequence 812. Upon receiving the connect sequence 802, transceiver 606 transmits to the connect interrupt processor 410 of the control electronics 116 a connect request (State diagram 7a). The connect interrupt processor 414 checks to see if the switch matrix is processing another connect request, and if not, generates a routing sequence to connect the serial data output port of transceiver 606 with the deserializer 400 of the control electronics 116. The connect interrupt processor 410 processes the connection request and generates a matrix configuration command via the state machine engine 422. Thereafter, the sequence generator 424 issues a connection command to the switch controller 114 of the switch matrix 106. The switch controller 114 of the switch matrix 106 thereafter configures the serial data output port of transceiver 606 to be coupled to the output port of the switch matrix 106 which is coupled to the deserializer 400 of the control electronics 116.

As is shown in FIG. 8a, the loop back portions of the switch matrix for the requesting node remains intact during this initial switching process up and until the actual connection to another port is completed as is described in state diagrams 7a and 7c. The source node transmits idle signals for the duration of the idle period 804 followed by the routing sequence 806 for receipt by the deserializer 400 and decoder 404 via transceiver 606 and switch matrix 106. As was described previously, the decoder will decode the routing packet and determine whether a connection request is being made or information is requested to be routed from the processor 408. The switch logic will then generate a fast switch service request for transmittal to the priority encoder 420 and routing to the state machine engine 422. The state machine engine 422 will make the appropriate connection depending upon the availability of the target node 604 (State diagram 7c). Assuming that the target node 604 is available, a request will be transmitted to the switch controller 114 to couple the source node 602 to the target node 604 in full duplex communication. The source node will generate an idle sequence for the duration of the second idle period 808 and thereafter initiate data transmission. In the preferred embodiment, the source node remains in loopback up and until the connection of the source node to the target node. Accordingly, the source node is able to see the entire sequence 800 looped back via the switch matrix 106. This allows the source node to recognize when a connection has failed. Specifically when the source node sees the data stream 810 returned via the loopback at the switch matrix, the connection request has been denied.

Figure 8C:
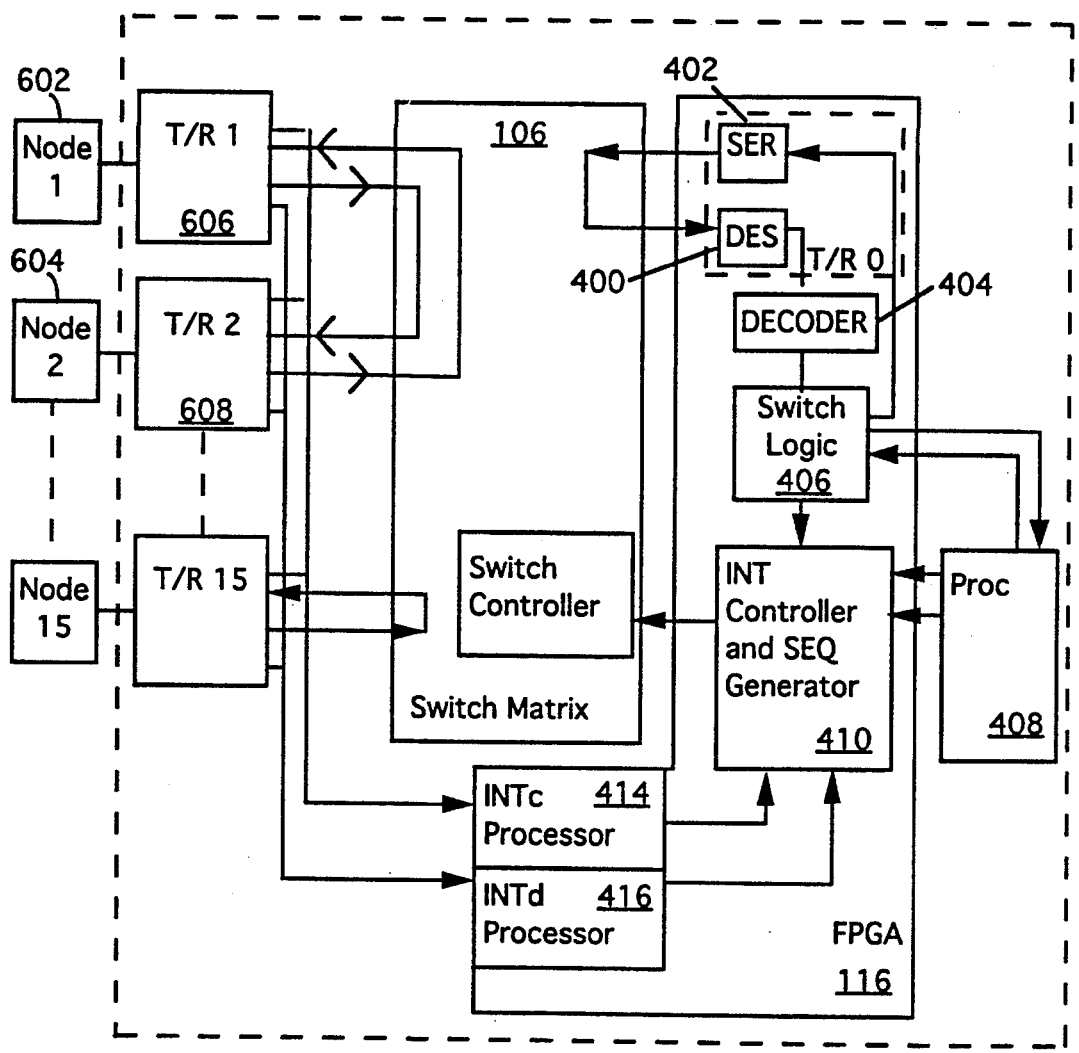
FIG. 8c shows the resultant switch configuration after the switching apparatus according to the preferred embodiment of the present invention has processed a fast switch request from the decoder.

Referring now to FIG. 8c, the resultant switch configuration is shown where a full duplex communication is established between source node 602 and target node 604.

Figure 8D:
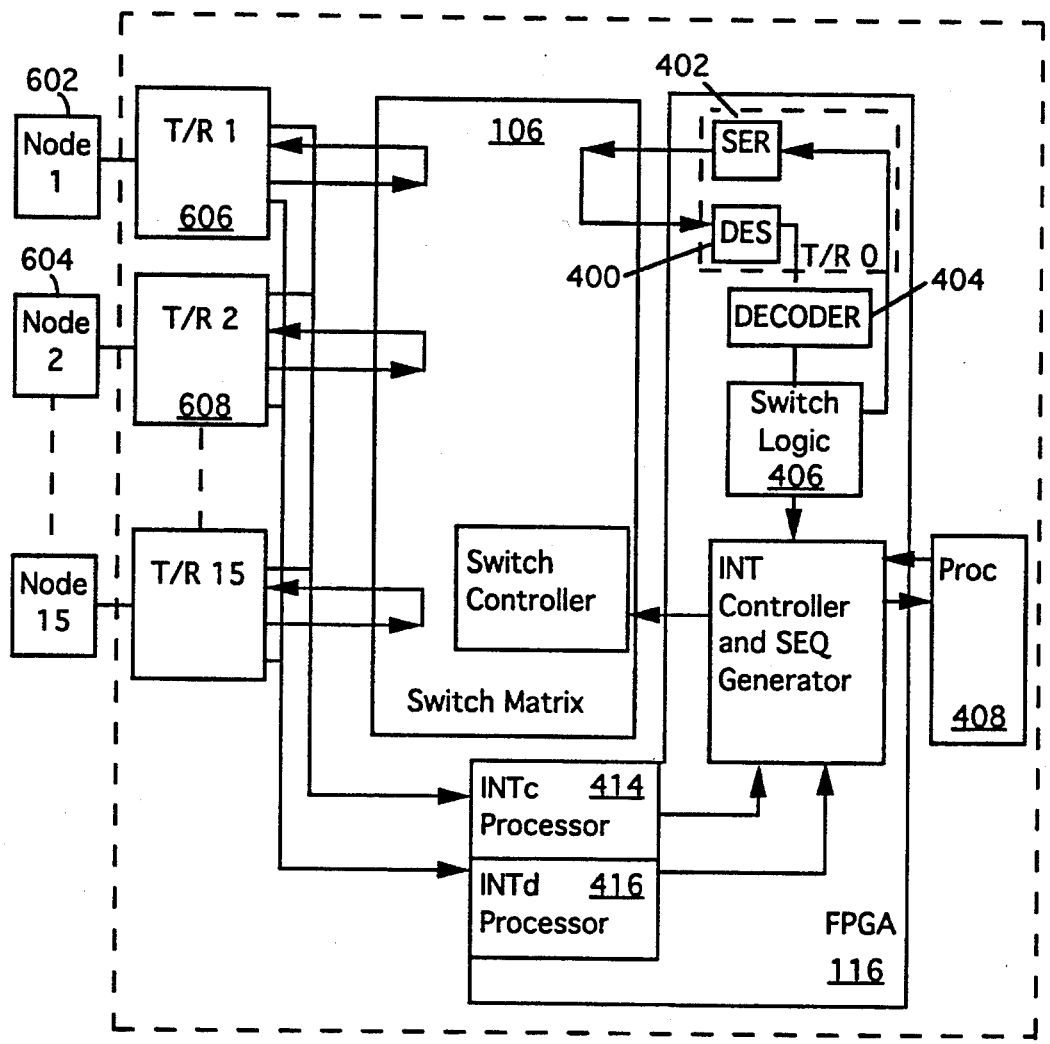
FIG. 8d shows the resultant switch configuration after the switching apparatus according to the preferred embodiment of the present invention has processed a disconnect interrupt from the INTd processor.

When node 602 and 604 have completed their transaction, one or both will send a disconnect sequence 812 (IntD). Upon receipt of the disconnect signal from either source node 602 or 604, the transceiver coupled with the requesting node will issue a disconnect request to the disconnect interrupt processor 416 of the control electronics 116. The disconnect interrupt processor 416 will in turn store in its mask register 418 the disconnect request associated with this transceiver. The disconnect interrupt processor 416 will generate a disconnect request for transmittal to the sequence generator 410 (State diagram 7b). Sequence generator 410 will format the disconnect request for transfer to the switch matrix 106. Upon receipt of the disconnect request by the switch controller 114, the switch matrix will re-establish loop back connections for nodes 602 and 604 as is shown in FIG. 8d.

Figure 9A:
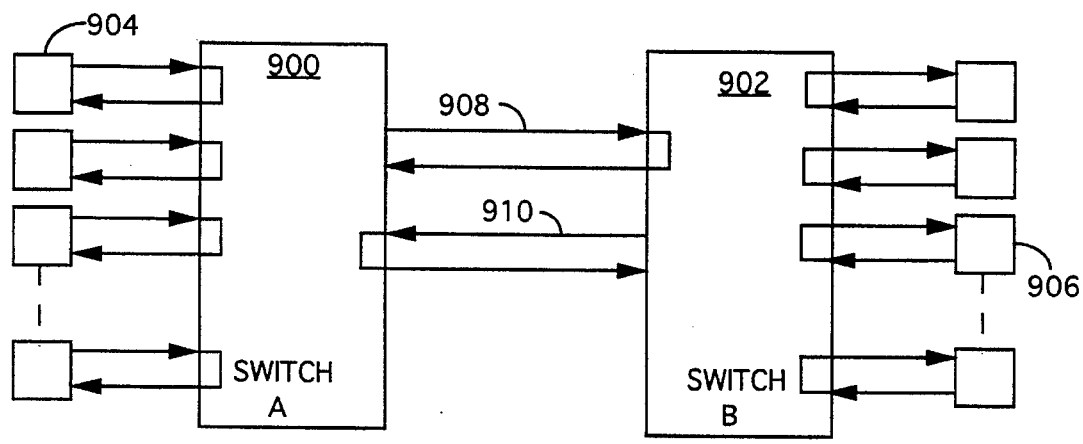
FIG. 9a shows a multi-switch configuration implemented by interconnecting a pair of switching devices according to the preferred embodiment of the present invention.

Referring now to FIG. 9a, a second embodiment of the present invention is shown including two switching apparatus 900 and 902. The basic network of nodes and a single switch can be extended to include multiple switches where links exist between switches as well as between "subscriber" nodes and switches. In the preferred embodiment, two links are used between each pair of switches. However, it would be possible to link a pair of switches with a single link, understanding that only a single connection between the switches could be maintained at any time. For the purpose of explanation, we will designate switching apparatus 900 as switch A and switching apparatus 902 as switch B. Switch A is configured such that two links are oriented to flow traffic to or receive traffic from switch B. Switch B is configured in a complementary manner again utilizing two links of the switch matrix to allow for two communication links between switch A and switch B.

Figure 9B:
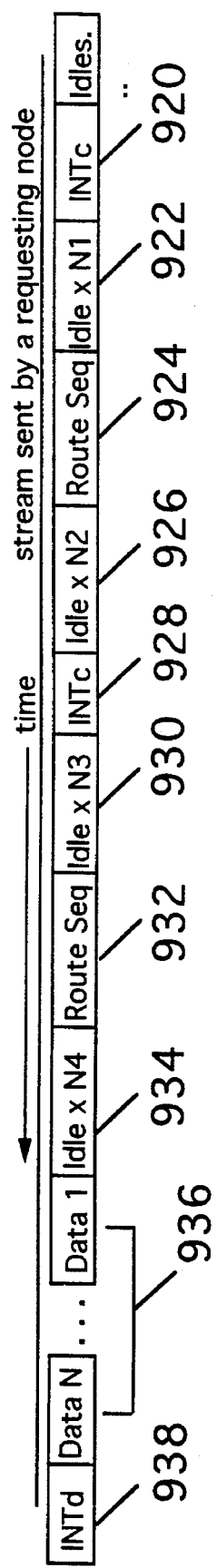
FIG. 9b shows a data sequence over time for transmission by a requesting node to establish a connection to a target node in a multi-switch configuration.

Referring now to FIG. 9b, a representative data stream for requesting a connection between nodes connected to different switches is shown. The transmission protocol for establishing a node to node connection where each node is connected to a different switch is a simple extension of the basic network whereby two routing sequences precede data that is to be transferred between a requesting node and a target node. In the basic network described previously, a connect sequence 920 is issued first by a requesting node to its associated local switch followed by a first idle period 922. During the first idle period 922, the local switch performs the same basic sequence as described previously for connecting the deserializer to receive routing data. Upon the expiration of the first idle period, the requesting node transmits a first route sequence 924 for connection to an outbound node (one connected between the two switches) followed by a second idle sequence 926. During the second idle sequence 926, the local switch processes the route request, and if the routing request is granted (i.e., the requested outbound node is available) the local switch makes the desired first connection.

The requesting node will next send a second connect sequence 928 to be passed by its local switch to the target switch associated with the target node followed by a third idle period 930. Just as was described previously, the requesting node assumes that the connection in its associated node to an outbound node has been made, and as such the receipt of the second connect sequence back via a loopback connection in the target switch must be distinguishable from a rejected first connection in its own associated local switch. In the preferred embodiment, these loopbacked signals can be distinguished by breaks in the return stream attributed to switching through the connection to the second switch upon the successful connection through the first switch. During the third idle period 930, the target switch performs the same basic sequence as described previously for connecting the deserializer in the target switch to receive routing data if available. Upon the expiration of the third idle period, the requesting node transmits a second route sequence 932 followed by a fourth idle sequence 934. During the fourth idle sequence 934, the target switch processes the route request, and if the routing request is granted (requested node is available) the target switch makes the desired second connection. Thereafter the requesting node can forward data 936 to the target node and terminate the communication link by sending a disconnect sequence 938.

In this embodiment, a user must request information from the local switch processor as to the configuration of switch to determine the identification of any outbound nodes. The switch configuration is assumed to be accurate over time periods larger than a few milliseconds. Accordingly, this information does not actually represent the switch state, but rather the nodes attached to each switch that are generally available for traffic. Those ordinarily skilled in the art will recognize that in this switch configuration, the source node must recognize which port of the switch matrix and associated transceiver is coupled between the local and target switches.

Figure 10:
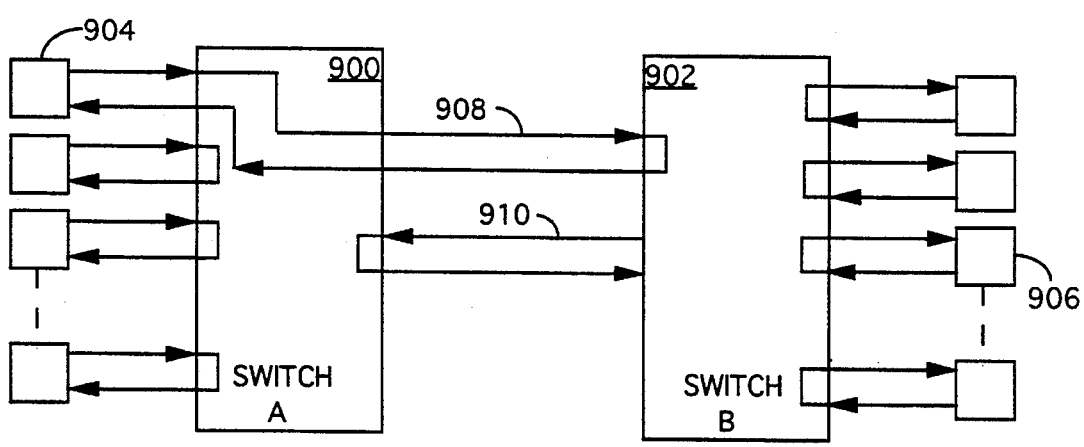
FIG. 10 shows a multi-switch configuration after a first connection request has been serviced by an interfacing switch.

Referring again to FIG. 9a, in order to initiate communication between a source node 904 and a target node 906 which is connected to switch B, the source node 904 will issue a first connect request identifying a connection request in switch A be made between the source node 904 and either link designated for transmitting (or receiving) traffic to and from switch B. Upon processing the first connect request, switch A will be configured such that a link exists between the source node 904 and switch B via the A traffic link 908 as is shown in FIG. 10.

Upon completing the connection internal to switch A that allows for the transmittal of traffic to switch B, source node 904 will generate a second connect request identifying target node 906. The second connect request will be ignored by Switch A's interrupt connect processor 414, as indicated in the discussion above concerning state 465, shown in FIG. 7a.

Figure 11:
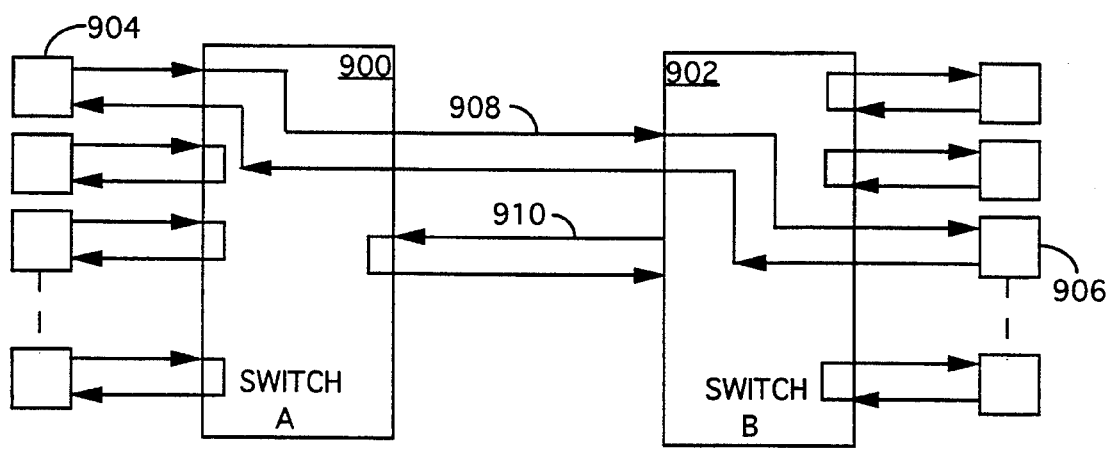
FIG. 11 shows a multi-switch configuration after a second connection request has been serviced thereby allowing for full duplex communication between nodes connected to different switches.

Switch B will process the second connect interrupt request generated by the source node 904 just as in the basic switching apparatus as described previously. Upon the availability of the target node 906, a link will be established between source node 904 and target node 906 as shown in FIG. 11. Just as was described above, any source node which is connected to switch B may request connection to a target node connected to switch A in a similar fashion utilizing either link between switch B and switch A for traffic originating at switch B.

In an alternative embodiment, the present invention can be configured to allow the source node 904 to request a first target node which is not connected to switch A. This can be accomplished by means of the routing packet information as described previously which indicates both a switch ID and a port ID for any given connection request. Accordingly, the first connection request transmitted by source node 904 could identify a different switch (e.g., Switch B). The control electronics 116 in Switch A, which receives the connect request from the source node 904, could then automatically determine a routing path to Switch B from internally stored routing information and then connect the source node via any of Switch A's output ports that are coupled to Switch B without requiring the individual user node to determine exactly which port this is. Accordingly, the user node 904 is not required to poll switch A to determine which port is being utilized currently by the switch for traffic outbound to other switching devices. This type of non-polled switching is especially desirable when more than two switching apparatus are interconnected.

Figure 12:
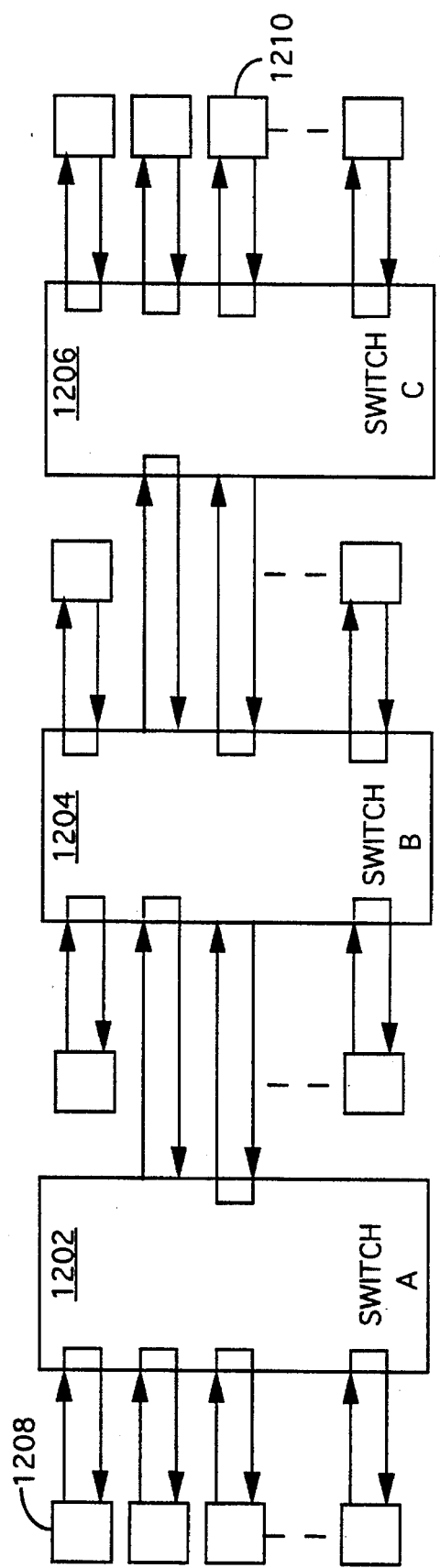
FIG. 12 shows a three switch configuration utilizing three switches according to the preferred embodiment of the present invention.

Referring now to FIG. 12, a three switch configuration is shown. In the three switch configuration, again, each switch 1202, 1204 and 1206 is provided with at least one link for transmitting traffic destined from each individual switch to the adjoining switches. Those ordinarily skilled in the art will recognize that any number of switches may be linked together in a similar fashion including linking all of the switches in a ring. In the preferred embodiment at least two links are provided between each pair of interconnected switches, which requires "central" switches such as switch 1204 to dedicate four of its links for connections to other switches. A source node 1208 connected to switching apparatus 1202 may request connection to a target node 1210 which is connected to switching apparatus 1206 by providing a first interrupt connect sequence to the switching apparatus 1202 to which it is tied. This first connect sequence will provide a link between the source node 1208 and the switching apparatus 1204 via switching apparatus 1202. A second connect request generated by the source node 1208 will provide for connection of the source node 1208 to the switching apparatus 1206 via switches 1202 and 1204. Finally, the source node may generate a third connect request designating the target node 1210 for full duplex communication between the source node 1208 and the target node 1210. Switch 1206 will process the connect request in the same manner as described previously in order to provide communication between the two nodes.

It is worth noting that in the connection configurations shown in both FIG. 11 and FIG. 12, a single disconnect request transmitted by either the source or target node will cause all of the intervening switches to disconnect all portions of the communication link between the two nodes because the disconnect request will be transmitted by each switch to the next switch, causing disconnection actions to be taken in its wake by each of the switches shortly after the disconnect request passes through each switch.

Figure 13:
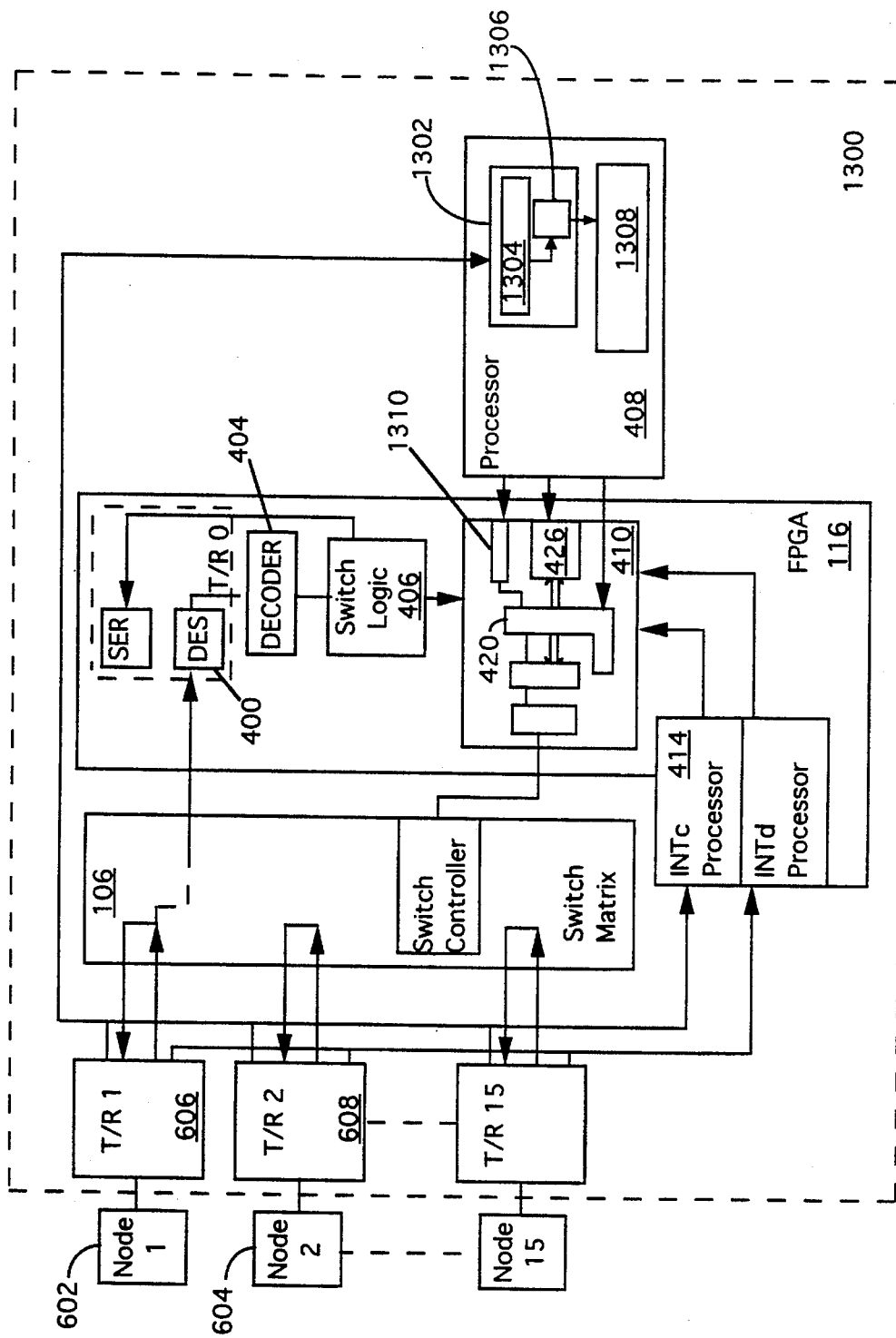
FIG. 13 is a block diagram of a switching device according to the preferred embodiment of the present invention including a Time Processing Unit for processing queued connection requests.

Referring now to FIG. 13, a third embodiment of the present invention is shown including a switching apparatus 1300. Switching apparatus 1300 includes transceivers 606 and 608 for coupling data from source nodes via the switch matrix 106. The IntC output port of each transceiver 606 and 608 is connected to the connect interrupt processor 414 as well as to the switch processor 408. In the preferred embodiment, the processor 408 is a 32 bit micro-controller, part number MC68332 manufactured by Motorola. The switch processor 408 includes a time processing unit 1302 (TPU), for queuing connection requests received from the individual transceivers 606. In this embodiment, a source node 602 having failed to make a connection by the normal process of requesting a switch configuration as described above, can queue a connection request by means of the time processing unit in the processor 408. In order to queue a request, a source node 602 will initiate a series of connect sequences for transmittal via a transceiver 606 to the processor 408, and specifically to the time processing unit 1302.

In the preferred embodiment, the time processor unit 1302 includes 16 channels for connection to each of the 16 transceivers 606 associated with the 16 port switch matrix 106 of the present invention. Time processor unit 1302 further includes a processing engine 1304 capable of measuring the pulse width between signals received on any individual channel connected to the TPU 1302.

In order to make a connection in the queuing mode, a source node 602 will transmit a first connection request sequence for processing by the switching apparatus 1300. The transceiver 606 connected to the source node 602 will transmit an INTc connection request to the processor 408 upon receipt of the connection request from the source node 602. The processing engine 1304 will identify a time mark associated with the leading or falling edge of the connection request signal generated by the transceiver 606, and capture this time reference. Source node 602 will then generate a second INTc connect request sequence for transmittal to the transceiver 606. The length of time (detected as a pulse width) between the transmission of the first connect request and the second connect request is set to correspond to the target node location. In the preferred embodiment, this is accomplished by establishing 16 different pulse widths (or delay lengths between pulses) associated with the 16 ports which are possible target nodes in the switch matrix 106. For example, given a time unit of α, a pulse width corresponding to 8×α would indicate that the source node is requesting a connection to the 8th node in the switch matrix. Upon receipt of the leading or trailing edge of the second connection request signal from the transceiver 606, the processing engine will again mark the time reference associated with this second connection request signal. The engine will thereafter calculate the difference between the occurrence of those two signals to derive a pulse width associated with the delay between the first connect signal and the second connect signal. This translated information is stored as a 4 bit nibble (a binary representation of the pulse width, having a value between 0 and 15, associated with the particular target node that is being requested for connection to the source node 602). The target node nibble is stored in a dual port ram 1306 within the TPU 1302.

The source node ID is stored as a second nibble in the dual port ram 1306 as identified by the individual line connection to the TPU 1302 which receives the connection request sequences.

Finally a third nibble of information, associated with priority or control, is transmitted by the source node to the switch apparatus in the form of a second pulse width between the second INTc connection request and a third INTc connection request, using the same pulse width encoding scheme as described above. This information is decoded and stored in the dual port ram 1306 by the TPU 1302.

Finally, an interrupt is set by the TPU for servicing by the CPU upon receipt of the routing information in this queued mode. The CPU will attempt to process the routing information by first checking to see if another queued request already exists for the source port by checking the value of the requested destination stored in Nibble 2 for the source port in the routing tables 426. If no other destination is currently pending for the source port, the CPU will write the target ID information to the routing table 426 at the Nibble 2 location for the source port, thereby indicating that the source port is requesting a connection to the target port upon availability of both. The CPU will set a flag in the queue register 1310 located within Interrupt Controller and Sequence Generator 410. The queue register 1310 stores priority/control information derived by the TPU from the queued command requests, along with the source ID associated with the queued request. The queue register 1310 generates a service request for issuance to the priority encoder 420.

Figures 14, 15:
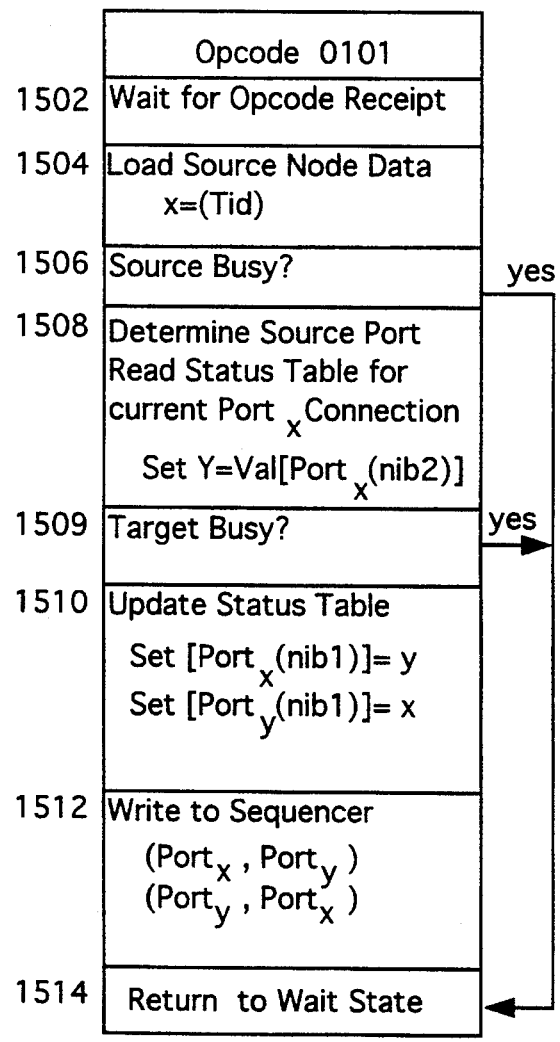
FIG. 14 shows the state machine engine command format as generated by the priority encoder according to the preferred embodiment of the present invention including a queue request.
FIG. 15 shows the flow of the state machine engine responsive to a queued connection request from the TPU according to the preferred embodiment of the present invention.

In this embodiment, the priority encoder 420 gives the lowest priority to queued connection requests and generates a state machine command associated with a queued connection request as is shown in FIG. 14. In the preferred embodiment, the priority of the queued connection may be increased by providing priority information along with the queued request, such priority information able to be passed on to the priority encoder by the queue register 1310. Specifically, the queue register sets a flag to be serviced by the priority encoder 420 that a queued request is pending. Upon receipt of a connection request from the queue register 1310, the priority encoder 420 evaluates the priority code stored for the request in the queue register and generates a state machine command 1402 if the priority level is high enough, or if the state machine is otherwise available. The state machine command 1402 includes a source ID 1404 indicating to the state machine engine 422 that a particular source port (source ID 1404) has a queued connection request pending.

Referring now to FIG. 15, the process for performing a queued connect sequence responsive to a state machine command 0101 is shown. The state machine engine 422 will idle in a wait state until receipt of a state machine command as described above. Upon receiving a state machine command having an op code value of 0101 (1502), the state machine engine will load 1504 the source node data from the priority encoder 420 identifying a source node (Port x) for connection. The state machine will check the status table stored in the dual port SRAM 426 to determine whether the source node is busy at this time (connected to another port) 1506. If the source node is currently busy, the state machine will assume that the source node no longer desires the queued transaction and will reset the "output port requested" (nibble 2) in the status table entry for the source port to 0 (1511), thereby discarding the queued request, after which the state machine will revert to the wait state if the source is currently busy 1514.

If the source node is available, the state machine next will determine the target node. Recalling from above, the CPU writes the target information into the second nibble for the source node simultaneously with the setting of the queue register. Accordingly, the target node (Port y) information may be derived by reading the state table nibble 2 value associated with source node at Port x 1508. The status bits associated with the target node in the status table are checked to determine if the target node is busy (1509). If the target node is busy, the state machine will leave the status table entries unchanged, and write back to the queue register 1310 the source ID and priority information so as to allow for the re-servicing of the queued request by the priority encoder at a latter time. Thereafter, the state machine reverts to the wait state 1514. Those ordinarily skilled in the art will recognize that an additional status bit in the routing table could be utilized as a flag to be serviced by the priority encoder for queued requests. The priority encoder can then be modified to service the queued request by evaluating the routing table data for the individual port whose flag is set, without the need for an intermediary queue register.

If the target node is available (1509), the state machine writes an update 1510 to the routing tables stored in the dual port SRAM 426 to set the Port x nibble 1 equal to y, and the Port y nibble 1 equal to x, and set the status bits to 11. In this way Port x and y will be cross coupled in full duplex mode. The state machine will then write a matrix configuration command 1512 to the sequencer 424 for transmission to the switch controller 114 of switch matrix 106 reflecting this reconfiguration. Finally, the state machine will return to the wait state until another state machine command is detected 1514.

Those ordinarily skilled in the art will recognize that no handshake between the source and target nodes is required in this configuration, where as here, the source node is independently capable of checking the status of the switch configuration by merely checking the loop back configuration of its own data.

Another embodiment of the queuing mode makes use of the basic switching configuration recited above. In this embodiment, the transceivers 104 couple the connect request signals to both the connect interrupt processor 414 and also to the processor 408 for queuing. However, in this mode a queued request, as described above, is generated and followed by a long delay period prior to transmitting data to the switch matrix. This long delay period reflects the average amount of time required to process a queued switch request. In the preferred embodiment this time period is set (in the source node) to "x" milliseconds. In this way, the switch functions much as in the first embodiment, where after a time delay (and in this case a longer time delay associated with the average amount of time that a queued command will take to be executed), data is transmitted from the source node to the target node assuming that a connection has been made. Again, just as in the first embodiment, the indication that the connection has not been made will arise when the user data is looped back to the source node. Those ordinarily skilled in the art will recognize that again a handshake between the microprocessor 408 and the source node 402 is not required in order to establish a communication link between the source and target node.

ALTERNATE EMBODIMENTS

Figure 16:
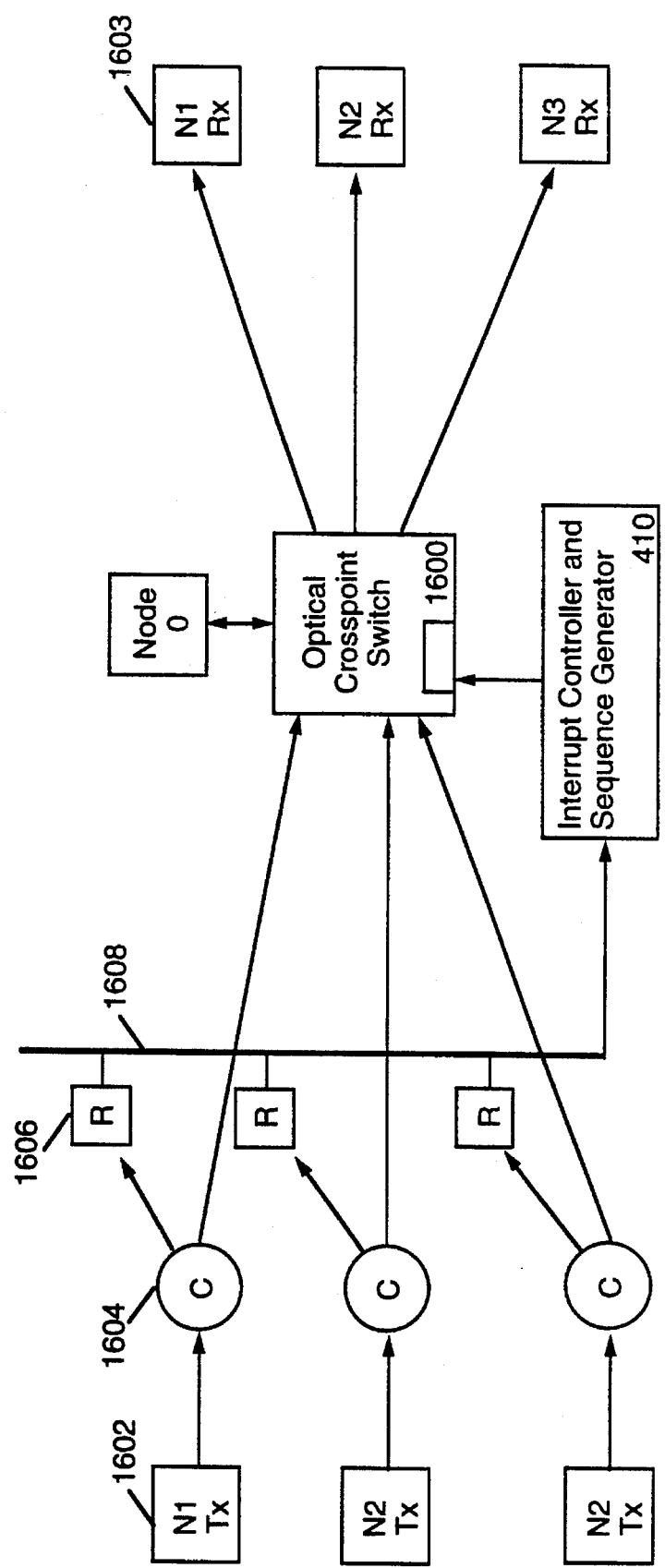
FIG. 16 is a block diagram of a switching apparatus according to a second preferred embodiment of the present invention that utilizes an optical crosspoint switch.

Referring to FIG. 16, an alternate embodiment of the present invention is shown including a optical crosspoint switch 1600. In this embodiment each node comprises a transmitter 1602 and receiver 1603. Each receiver is connected directly to the optical switch 1600 while each transmitter 1602 is connected to the optical switch 1600 via an optical coupler 1604. The optical coupler 1604 splits a percentage of the light energy received from a requesting node off to a receiver/detector 1606. The remaining light energy is coupled to the optical switch 1600. In this embodiment, the coupler receives the connect sequence from a requesting node and splits a percentage of the light energy to the receiver/detector 1606. The receiver 1606 detects the presence of the connection sequence and issues a connection request via bus 1608 for processing by interrupt controller and sequence generator 1610. Those ordinarily skilled in the art will recognize that the optical switch 1600 performs much in the same way as the crosspoint switch of the preferred embodiment.

Figure 17:
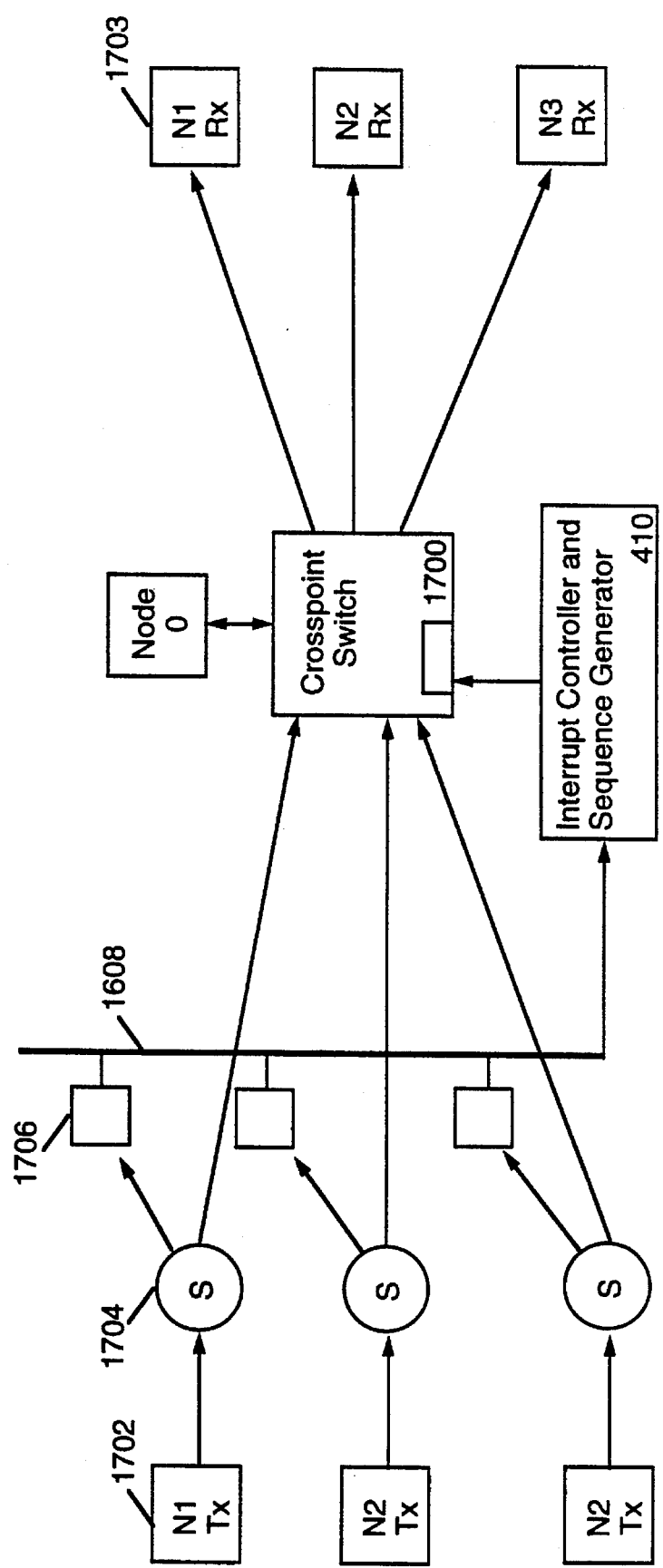
FIG. 17 is a block diagram of a switching apparatus according to a third preferred embodiment of the present invention that includes a coaxial interface between the nodes and crosspoint switch.

Referring to FIG. 17, a third embodiment of the present invention is shown including a coaxial interface between the nodes and crosspoint switch 1700. In this embodiment each node includes a transmitter 1702 and receiver 1703. Each receiver is connected directly to the crosspoint switch 1700 via a coaxial interface while each transmitter 1702 is connected to the crosspoint switch 1700 via a splitter 1704. The splitter 1704 splits the signal received from a requesting node into two identical (slightly attenuated) signals. The first signal is coupled to a sensor 1706 for detecting the connect and disconnect sequences. The second signal is coupled to the crosspoint switch 1700. In this embodiment, the splitter receives the connect sequence from a requesting node, splits it into two signals, one of which is coupled to the sensor 1706. The sensor 1706 detects the presence of the connection sequence and issues a connection request via bus 1708 for processing by interrupt controller and sequence generator 1710. Those ordinarily skilled in the art will recognize that the crosspoint switch 1700 performs much in the same way as the crosspoint switch of the preferred embodiment.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A high speed network switch, comprising:

a plurality of transceivers for interfacing directly with a like plurality of user nodes, each of said transceivers having a receive and transmit through port for passing data to and from said user nodes and said network switch, said data comprising a connect sequence, a first wait sequence, a routing packet, a second wait sequence, and user data;

isolation means for initializing each transceiver for looping back said data;

switching means for directly connecting any pair of said transceivers; and a controller for establishing and prioritizing matrix connections and disconnections, decoding said routing packet and scheduling said switching means connections, such that a requesting node sequentially transmits said connect sequence, routing packet and user data to said network switch assuming node-to-node communication will be established with a target node, said isolation means looping said user data back to said requesting node when said target node is unavailable.

2. The network switch of claim 1 wherein said data further comprises a disconnect sequence after said user data, said connect sequence and disconnect sequence are complementary unbalanced binary sequences.

3. The network switch of claim 1 wherein said routing packet contains connection information and control processor requests, said connection information comprising a network switch id and port id for connection to a requesting port.

4. The network switch of claim 1 wherein said controller further includes a control processor, said control processor for receiving a queue request from said requesting node upon the unavailability of said target node, said queue request including said routing packet such that said control processor can communicate with said controller to establish a link between said requesting node and said target node upon the availability of said target node.

5. The network switch of claim 4 wherein said controller further includes means for communicating with said requesting node that said queue request has been serviced and said target node is available for communication.

6. The network switch of claim 1 further including a time processing unit, said time processing unit for queuing a matrix connection request upon receipt of a pair of said connect sequences with a reference delay therebetween from said requesting node, said reference delay indicative of the identity of said target node, said queued matrix connection request serviced by said controller upon availability of said target node.

7. A method for establishing node-to-node communication in a network, said network having a plurality of nodes directly connected to a network switch having a like plurality of transceivers, a switch matrix for connecting any of said nodes, a controller for prioritizing and servicing switch connections and disconnections, and a switch processor, the method comprising the steps of:

(a) initializing said switch matrix to loop-back transmissions for each transceiver;

(b) initiating a first communication link between a requesting node and a target node, said requesting node transmitting a connect sequence, a first wait sequence, a routing packet, a second wait sequence, and user data to a first transceiver of said network switch;

(c) routing said routing packet directly to said controller from said first transceiver;

(d) decoding said routing information to determine a switch configuration;

(e) if said target node is available, configuring said switch matrix to connect said requesting node to said target node; and (f) looping said user data back to said requesting node when said target node is unavailable.

8. The method of claim 7 further including the step of:

(a) upon looping said user data back to said requesting node when said target node is unavailable, generating a queued request for establishing a connection between said requesting node and said target node.

9. The method of claim 8 wherein said generating a queued request step includes the steps of:

(a) initiating a second communication link between said requesting node and said target node, (b) encoding a route request for connecting said requesting node to said target node, said encoded route request comprising a first connect sequence, an idle period, followed by a second connect sequence for transmission to said first transceiver of said network switch;

(c) routing said encoded route request directly to said switch processor from said first transceiver;

(d) decoding said encoded route request to determine route data including said target node id;

(e) queuing a route request by storing said route data in a queue register for servicing by said controller;

(f) establishing a connection upon the availability of said source and target node; and (g) looping back to said requesting node all signals generated by said requesting node until said connection is established with said target node.

10. The method of claim 9 wherein said encoding step includes delaying the transmission of said second connect sequence to said transceiver by a predetermined amount of time T, where the amount of time T is equal to $N*t_0$, where N equals a port id assigned to the target node and $t_0$ equals a predetermined increment of time measurable by said switch processor.

11. A method for queuing a node to node connection request for establishing node-to-node communication in a network, said network having a plurality of nodes directly connected to a network switch having a like plurality of transceivers, a switch matrix for connecting any of said nodes, a controller for prioritizing and servicing switch connections and disconnections, and a switch processor for queuing route requests, the method comprising the steps of:

(a) initializing said switch matrix to loop-back transmissions for each transceiver;

(b) initiating a first communication link between a requesting node and a target node by encoding a route request designating a target node and transmitting said encoded request to said first transceiver, said encoded request comprising a first connect sequence, an idle period, followed by a second connect sequence;

(c) routing said encoded route request directly to said switch processor from said first transceiver;

(d) decoding said encoded route request to determine route data including said target node;

(e) queuing a route request by storing said route data in a queue register for servicing by said controller;

(f) establishing a connection upon the availability of said target node; and (g) looping back to said requesting node all signals generated by said requesting node until said connection is established with said target node.

12. The method of claim 11 wherein said encoding step includes delaying the transmission of said second connect sequence to said transceiver by a predetermined amount of time T, where the amount of time T is equal to $N*t_0$, where N equals a port id assigned to the target node and $t_0$ equals a predetermined increment of time measurable by said switch processor.

13. A high speed network switch comprising:

a plurality of transceivers for interfacing directly with a like plurality of user nodes, each of said transceivers having a receive and transmit through port for passing data to and from said user nodes and said network switch, said data comprising a connect sequence, a first wait sequence, a routing packet, a second wait sequence, user data and a disconnect sequence;

a switch matrix for directly routing data between said transceivers, said switch matrix comprising a switch matrix controller, a plurality of ports, and means for switching data between said ports, each of said transceivers coupled to one of said plurality of ports of said switch matrix, said switch matrix for cross coupling receive and transmit through ports for any pair of transceivers of said network switch; and a controller for establishing and prioritizing matrix connections and disconnections, said controller comprising:

(a) at least one transceiver for receiving routing information from said nodes and for transferring configuration information to said switch matrix, said transceiver including a serializer for formatting outbound serial data streams for transmission to said nodes and a deserializer for receiving inbound serial data streams from said nodes for processing, (b) a decoder coupled to said deserializer for decoding routing information from said inbound serial data streams to determine a desired connect configuration, (c) a connect interrupt processor coupled to each of said transceivers for processing connect requests from said nodes, (d) a disconnect interrupt processor coupled to each of said transceivers for processing disconnect requests from said nodes, (e) a routing table for storing matrix configuration information, (f) switch logic coupled between a control processor, said decoder and said serializer, said switch logic for routing node network configuration requests from said decoder to said control processor and for transferring network configuration information to said serializer for output to said nodes, (g) a priority encoder for processing service requests generated by said connect interrupt processor, said disconnect interrupt processor, said switch logic and said control processor and outputting a state machine command;

(h) a state machine engine for processing state machine commands to update said routing tables and issue switch configuration commands; and (i) a sequence generator responsive to said switch configuration commands for formatting instructions to be passed to said switch matrix controller for configuring said switch matrix;

wherein said controller is configured to process said inbound serial data streams using routing protocol wherein a requesting node sequentially transmits said connect sequence, routing packet and user data assuming that requesting node to target node communication will be established, said switch matrix looping said user data back to said requesting node when said target node is unavailable.

14. The network switch of claim 13 wherein each of said transceivers includes a receive through port and a transmit through port, and said switch matrix couples each of said transceivers' receive through port to said same transceiver's transmit through port while said nodes are inactive.

15. The network switch of claim 13 wherein said routing packet contains connection information and control processor requests, said connection information comprising a network switch id and port id for connection to a requesting port.

16. The network of claim 13 wherein said switch control processor receives a queue request from said requesting node upon the unavailability of said target node, said queue request includes said routing packet such that said control processor can communicate with said controller to establish a link between said requesting node and said target node upon the availability of said target node.

17. The network switch of claim 16 wherein said switch controller further includes means for communicating with said requesting node that said queue request has been serviced and said target node is available for communication.

18. The network switch of claim 13 further including a time processing unit, said time processing unit for queuing a matrix connection request upon receipt of a pair of said connect sequences with a reference delay therebetween from said requesting node, said reference delay indicative of the identity of said target node, said queued matrix connection request serviced by said controller upon availability of said target node.

19. A high speed network switch comprising:

a plurality of optical couplers for receiving optical input signals from a like plurality of user nodes, each of said optical couplers having a first and second output, each of said couplers for passing data to said network switch, said data comprising a connect sequence, a first wait sequence, a routing packet, a second wait sequence, and user data;

a like plurality of receivers each coupled to a first output of an associated one of said optical couplers, said receivers for detecting said connect and disconnect sequence;

an optical switch for directly connecting any pair of said nodes having a like plurality of ports, each of said ports having an input and an output, said input of each port coupled to said second output of an associated one of said optical couplers, said output of each of said ports coupled to an associated one of said nodes;

isolation means for initializing each port for looping back said data to an associated one of said nodes; and a controller for establishing and prioritizing matrix connections and disconnections, decoding said routing packet and scheduling said switching means connections, such that a requesting node sequentially transmits said connect sequence, routing packet and user data to said network switch assuming node-to-node communication has been established with a target node, said isolation means looping said user data back to said requesting node when said target node is unavailable.

20. The network switch of claim 19 wherein said data further comprises a disconnect sequence after said user data, said connect sequence and disconnect sequence are complementary unbalanced binary sequences.

21. The network switch of claim 19 wherein said routing packet contains connection information and control processor requests, said connection information comprising a network switch id and port id for connection to a requesting port.

22. The network switch of claim 19 wherein said controller further includes a control processor, said control processor for receiving a queue request from said requesting node upon the unavailability of said target node, said queue request including said routing packet such that said control processor can communicate with said controller to establish a link between said requesting node and said target node upon the availability of said target node.

23. The network switch of claim 22 wherein said controller further includes means for communicating with said requesting node that said queue request has been serviced and said target node is available for communication.

24. The network switch of claim 19 further including a time processing unit, said time processing unit for queuing a matrix connection request upon receipt of a pair of said connect sequences with a reference delay therebetween from said requesting node, said reference delay indicative of the identity of said target node, said queued matrix connection request serviced by said controller upon availability of said target node.

25. A high speed network switch comprising:

a plurality of user nodes, each of said nodes having a receive and transmit port for passing data to and from said network, said data comprising a connect sequence, a first wait sequence, a routing packet, a second wait sequence, and user data;

a like plurality of splitters for receiving said data from said user nodes, each of said splitters having a first and second output;

a like plurality of sensors for detecting said connect and disconnect sequences, each of said sensors receiving data from an associated user node via a first output of an associated one of said splitters;

switching means for directly connecting any pair of said user nodes, said switching means having a plurality of ports having an input and output, said input for each of said ports coupled to a second output of an associated one of said splitters, said output of each of said ports coupled directly to an associated one of said nodes receive ports;

isolation means for initializing each port of said switching means for looping back said data sent from said transmit port of an associated user node to said receive port of the same user node;

a controller for establishing and prioritizing matrix connections and disconnections, decoding said routing packet and scheduling said switching means connections, such that a requesting node sequentially transmits said connect sequence, routing packet and user data to said network switch assuming node-to-node communication will be established with a target node, said isolation means looping said user data back to said requesting node when said target node is unavailable.

26. The network switch of claim 25 wherein said data further comprises a disconnect sequence after said user data, said connect sequence and disconnect sequence are complementary unbalanced binary sequences.

27. The network switch of claim 25 wherein said routing packet contains connection information and control processor requests, said connection information comprising a network switch id and port id for connection to a requesting port.

28. The network switch of claim 25 wherein said controller further includes a control processor, said control processor for receiving a queue request from said requesting node upon the unavailability of said target node, said queue request including said routing packet such that said control processor can communicate with said controller to establish a link between said requesting node and said target node upon the availability of said target node.

29. The network switch of claim 28 wherein said controller further includes means for communicating with said requesting node that said queue request has been serviced and said target node is available for communication.

30. The network switch of claim 25 further including a time processing unit, said time processing unit for queuing a matrix connection request upon receipt of a pair of said connect sequences with a reference delay therebetween from said requesting node, said reference delay indicative of the identity of said target node, said queued matrix connection request serviced by said controller upon availability of said target node.

* * * * *